(12) United States Patent
Guest et al.

(10) Patent No.: US 11,168,718 B2
(45) Date of Patent: Nov. 9, 2021

(54) THREE DIMENSIONAL WOVEN LATTICES FOR DRAG REDUCTION AND TURBULENCE REDUCTION

(71) Applicant: THE JOHNS HOPKINS UNIVERSITY, Baltimore, MD (US)

(72) Inventors: James Kevin Guest, Lutherville-Timonium, MD (US); Stefan Szyniszewski, Guildford (GB)

(73) Assignee: The John Hopkins University, Baltimore, MD (US)

( * ) Notice: Subject to any disclaimer, the term of this patent is extended or adjusted under 35 U.S.C. 154(b) by 500 days.

(21) Appl. No.: 15/479,453

(22) Filed: Apr. 5, 2017

(65) Prior Publication Data
US 2017/0356478 A1    Dec. 14, 2017

Related U.S. Application Data

(60) Provisional application No. 62/318,448, filed on Apr. 5, 2016.

(51) Int. Cl.
*F15D 1/12* (2006.01)
*B64C 21/10* (2006.01)
(Continued)

(52) U.S. Cl.
CPC .............. *F15D 1/12* (2013.01); *B64C 21/10* (2013.01); *B62D 35/001* (2013.01); *E01D 19/00* (2013.01);
(Continued)

(58) Field of Classification Search
CPC ......... F15D 1/12; B64C 21/10; Y02E 10/721; Y02P 70/523; F03D 1/0675; E04H 12/00;
(Continued)

(56) References Cited

U.S. PATENT DOCUMENTS 3,213,527 A * 10/1965 Glaze ...................... B64C 21/04
140/107
3,266,130 A * 8/1966 Glaze .................... B64C 21/025
228/182
(Continued)

OTHER PUBLICATIONS

Ruck, et al., The flow around circular cylinders partially coated with porous media. Porous Media and its Applications in Science, Engineering, and Industry 2012, 1453, 49-54.
(Continued)

*Primary Examiner* — Nathan L Van Sell
(74) *Attorney, Agent, or Firm* — John Hopkins Technology Ventures

(57) ABSTRACT

The present invention is directed to three dimensional (3D) woven lattices for drag and turbulence reduction. 3D woven lattice material can serve as a surface layer that regularizes the flow around a bluff body with beneficial effects on: 1) drag reduction, 2) decrease in turbulence intensity, 3) attenuation of flow-induced vibrations, and 4) aerodynamic noise cancellation. 3-D woven lattice architectures allows for passive flow control (without the need for external energy supply) around bluff bodies with restricted geometry/shape due to their functional requirements such as wind turbine towers, cargo trucks, train cars, etc. The woven material can be easily shaped to fit on various geometries and incorporated in existing manufacturing processes (from composites to metallic plates). Metallic foam and randomly porous materials have been identified in the literature as a promising solution for passive flow control over bluff bodies.

23 Claims, 26 Drawing Sheets

(51) Int. Cl.
*F01D 5/14* (2006.01)
*F03D 1/06* (2006.01)
*B62D 35/00* (2006.01)
*E04F 13/00* (2006.01)
*E01D 19/00* (2006.01)
*E04H 12/00* (2006.01)

(52) U.S. Cl.
CPC ............ *E04F 13/002* (2013.01); *E04H 12/00* (2013.01); *F01D 5/147* (2013.01); *F03D 1/0675* (2013.01); *F05B 2240/30* (2013.01); *F05D 2240/30* (2013.01); *F05D 2250/60* (2013.01); *Y02E 10/72* (2013.01); *Y02P 70/50* (2015.11)

(58) Field of Classification Search
CPC ... B62D 35/001; F01D 5/147; F05B 2240/30; F05D 2240/30; F05D 2250/60; E04F 13/002; E01D 19/00
See application file for complete search history.

(56) References Cited

U.S. PATENT DOCUMENTS

| | | | | |
|---|---|---|---|---|
| 3,428,278 | A * | 2/1969 | Glaze | B21F 27/005 245/8 |
| 8,864,082 | B2 * | 10/2014 | Syassen | B64C 21/06 244/209 |
| 2005/0061221 | A1 * | 3/2005 | Paszkowski | B63B 1/38 114/67 R |
| 2009/0114001 | A1 * | 5/2009 | Bernitsas | F03B 17/06 73/105 |
| 2009/0114002 | A1 * | 5/2009 | Bernitsas | F15D 1/12 73/105 |
| 2009/0250129 | A1 * | 10/2009 | Bernitsas | F03B 17/06 137/808 |
| 2010/0294892 | A1 * | 11/2010 | Syassen | B64C 21/06 244/209 |
| 2011/0274875 | A1 * | 11/2011 | Lang | B64C 21/10 428/119 |
| 2014/0248469 | A1 * | 9/2014 | Rawlings | B32B 3/30 428/172 |
| 2015/0017385 | A1 * | 1/2015 | Lang | F15D 1/003 428/141 |
| 2016/0159465 | A1 * | 6/2016 | Koppelman | B64C 21/06 244/209 |

OTHER PUBLICATIONS

Bruneau, et al., Control of vortex shedding around a pipe section using a porous sheath. International Journal of Offshore and Polar Engineering 2006, 16.
Bruneau, et al., Numerical modeling and passive flow control using porous media. Computers and Fluids 2008, 37, 488-498.
Butt, et al., Aerodynamic Characteristics of Flow over Circular Cylinders with Patterned Surface. International Journal of Materials, Mechanics, and Manufacturing 2013, 1(2), 121-125.
Gupte, et al., Flow near the permeable boundary of a porous medium: an experimental investigation using LDA. Experiments in Fluids 1997, 22, 408-422.
Sahraoui, et al., Slip and no-slip boundary conditions at interface of porous, plain media. International Journal of Heat Mass Transfer 1992, 35(4), 927-943.
Yagiz, et al., Drag minimization using active and passive flow control techniques. Aerospace Science and Technology 2012, 17, 21-31.
Zhao, et al., Permeability measurements and modeling of topology-optimized metallic 3-D woven lattices. Acta Materialia 2014, 81, 326-336.
Choi, Micro-Textured Surfaces for Omniphobicity and Drag-Reduction. Massachusetts Institute of Technology 2009.
Oggiano, Drag reduction and aerodynamic performances in Olympic sports. Norwegian University of Science and Technology 2010.
Wilpert, Drag and Wake Measurement on Cylinders and Discs for Wind Turbine Wake Modelling. Norwegian University of Science and Technology 2014.

* cited by examiner

NO SUCTION

SUCTION

DRAG COEFFICIENT
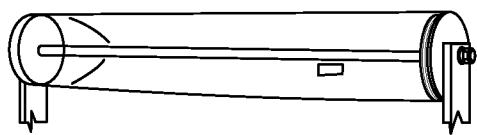
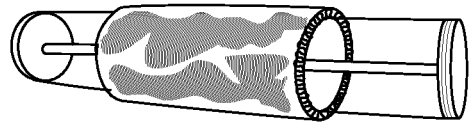
SMOOTH TUBE
1.18
FIG. 8A
TUBE WITH A POROUS MEDIA SHEATH
0.97
FIG. 8B

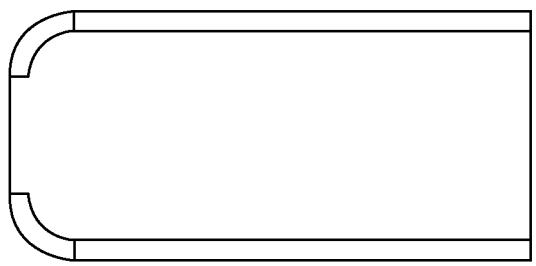
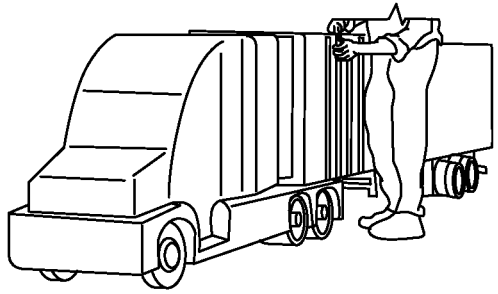
FIG. 9A
FIG. 9B

WUP-1/4

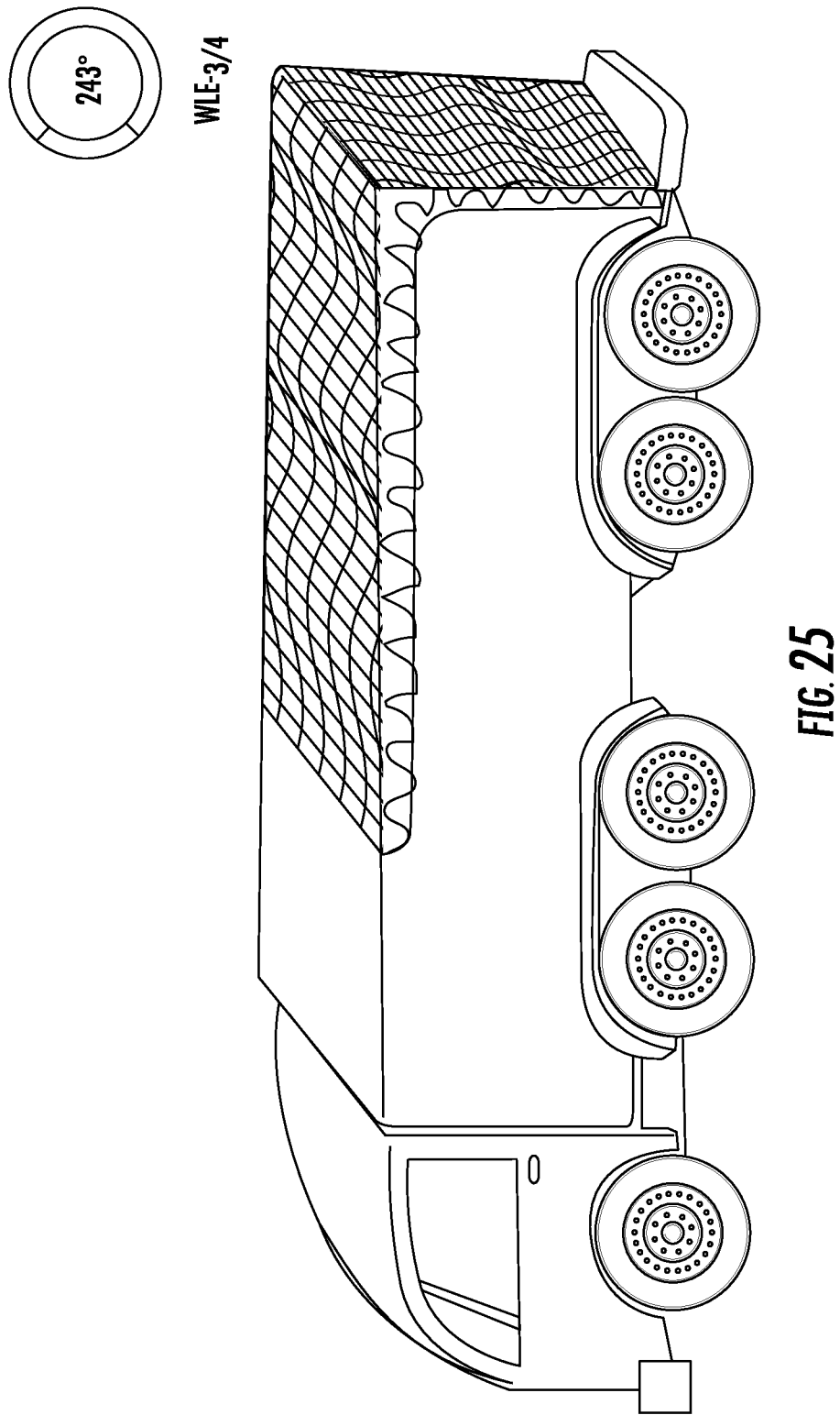

THREE DIMENSIONAL WOVEN LATTICES FOR DRAG REDUCTION AND TURBULENCE REDUCTION

CROSS REFERENCE TO RELATED APPLICATION

This application claims the benefit of U.S. Provisional Patent Application No. 62/318,448 filed on Apr. 5, 2016, which is incorporated by reference, herein, in its entirety.

GOVERNMENT RIGHTS

This invention was made with government support under W91CRB1010004 awarded by the Defense Advanced Research Projects Agency. The government has certain rights in the invention.

FIELD OF THE INVENTION

The present invention relates to cellular materials in which one or more properties have been optimized. More particularly the present invention relates to a three-dimensional lattice for drag reduction, turbulence reduction and reduction of vortex induced vibrations and noise.

BACKGROUND OF THE INVENTION

The reduction in fuel consumption, to reduce the cost of logistics, has been identified as an urgent priority. One way to reduce fuel consumption is to improve the efficiency of engines. However, advancements in IC engine design and the implementation of 'smart' controllers have been yielding diminishing returns. Electric and hybrid-electric drive systems offer an attractive alternative, but current battery technology limits power and range (and the batteries themselves pose a disposal problem, as these often contain dangerous and environmentally hazardous materials). Because over 50% of a road vehicle's fuel burn at cruise conditions is directed to overcoming aerodynamic drag, this provides an attractive target for technological development.

One way to reduce a vehicle's aerodynamic drag is to alter its shape; adding long boat-tails or fins can reduce drag significantly. However, these boat tails and fins alter the operational effectiveness of the vehicle—reducing passenger or cargo capacity, road maneuverability and ease of driving. Active drag reduction technology, such as the use of plasma actuators or synthetic jet arrays, add substantial cost and complexity to the vehicle, and are easily dirtied. Similarly, existing drag reduction technologies, such as the inclusion of riblets or bumps, compliant walls like the dolphin skin, splitter plates, wavy or rough surfaces, can actually reduce efficiency if operated outside of their design conditions (i.e., off design), and can significantly reduce efficiency if damaged.

Use of permeable surfaces, however, have been shown to be both highly effective in reducing drag. They remain functional off-design and, if fouled or damaged, cannot cause an increase in drag beyond that of the baseline geometry. Permeable sheath changes no-slip and zero tangential velocity boundary condition to a quasi-slip Fourier type boundary due to the Darcy-like flow inside the porous layer. This, in turn, reduces shear forces in the boundary layer and it decreases the rate of vorticity generation and regularizes the flow shedding around a bluff body drastically. Porous sheath also enables internal flow from the high pressure (flow facing region) to the leeside of the body with lower pressure. Thus, it reduces the pressure difference and the drag. Numerical simulations have shown noticeable flow regularization around a cylinder and vehicle like Ahmed's body. These numerical simulations demonstrate that flow resistance of vehicles could be reduced up to 40%. Because the numeric simulation did not employ proper optimization, but tested a couple of ad hoc configurations, the limit of possible reduction remains to be determined.

It would therefore be advantageous to provide a custom designed cellular structure that allows for more efficient flow control.

BRIEF DESCRIPTION OF THE FIGURES

FIGS. 8A and 8B illustrate drag coefficient of a smooth and sheathed tube measured in a student project supervised the author. Integration of the velocity in wake profile method was employed.

FIG. 9A illustrates a schematic of an Ahmed's body for 2D flows.

FIG. 9B illustrates an image of a representative model of a scaled lorry.

FIG. 25 illustrates an exemplary implementation of the drag reducing material of the present invention on a cargo trailer.

SUMMARY

Figure 1A:
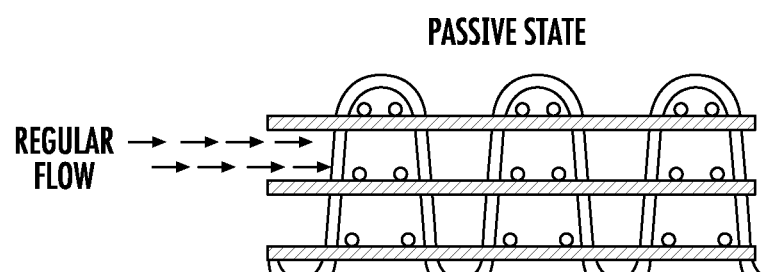
FIGS. 1A and 1B illustrate passive and active control of 3D micro-lattice material permeability through the use of the electromagnetic field.

The foregoing needs are met, to a great extent, by the present invention, wherein in one aspect a device for providing multiple functionalities includes either wires or bundles and yarns of wires woven as well as 3D printed woven-like or lattice-like architectures to create an optimized material. The wires or bundles and yarns of wires are woven into locations that are based on optimization of one or more properties that include fluid permeability, heat transfer, pumping power, temperature uniformity or mechanical stiffness.

In accordance with an aspect of the present invention, a device for providing regularization of fluid flow around a bluff body includes wires or bundles and yarns of wires woven to create a flow regularizing material configured to be applied at least in part to the bluff body. The wires or bundles and yarns of wires are woven so as to provide optimization of fluid flow around the bluff body. Surface texture of the flow regularizing material is controlled through spatial distribution of z-wires in the flow regularizing material.

In accordance with an aspect of the present invention, the flow regularizing material is configured to change a fluid flow boundary layer from no-slip to partial slip. The flow regularizing material is configured to provide passive leeward suction from the flow separation zone to the leeward side of the cylinder. The flow regularizing material is configured for spatial optimization of permeabilities and flow regularization. The flow regularizing material is configured for variations in directional permeability. The flow regularizing material is also configured for variations in directional permeability via tuning thickness and in-plane permeability based on geometry of the bluff body. The bluff body can take the form of a trailer. The fluid can take the form of air. The device can include a cover for the flow regularizing material. The cover can be configured with different levels of permeability.

In accordance with another aspect of the present invention, the flow regularizing material is applied to approximately 81° of a leading edge of the bluff body or in a range of degrees from 0-180°. Alternately, the flow regularizing material is applied to approximately 243° of a trailing edge of the bluff body or in a range of 45-300°. The flow regularizing material is used for regularizing flow on one of an aircraft wing-flap, aircraft landing gear, an automobile, and a cargo trailer. The wire can take the form of a solid wire, a hollow wire, and a yarn.

DETAILED DESCRIPTION OF THE PREFERRED EMBODIMENTS

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

The present invention is directed to three dimensional (3D) woven lattices for drag and turbulence reduction. 3D woven lattice material can serve as a surface layer that regularizes the flow around a bluff body with beneficial effects on: 1) drag reduction, 2) decrease in turbulence intensity, 3) attenuation of flow-induced vibrations, and 4) aerodynamic noise cancellation. 3-D woven lattice architectures allows for passive flow control (without the need for external energy supply) around bluff bodies with restricted geometry/shape due to their functional requirements such as wind turbine towers, cargo trucks, train cars, etc. The woven material can be easily shaped to fit on various geometries and incorporated in existing manufacturing processes (from composites to metallic plates). Metallic foam and randomly porous materials have been identified in the literature as a promising solution for passive flow control over bluff bodies.

Figure 1B:
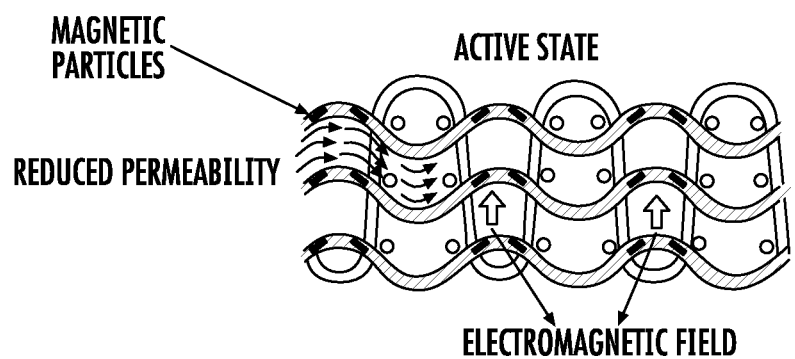

In addition to passive flow control, active flow control through the use of woven material is also possible by: (1) Changing the geometry of the selected wires with an external stimuli such as heat, electromagnetic field or current to change the material permeability as shown in FIG. 1B, (2) Shape memory effect, or (3) Active suction or blowing through the porous material. FIGS. 1A and 1B illustrate passive and active control of 3D micro-lattice material permeability through the use of the electromagnetic field.

Figure 2:
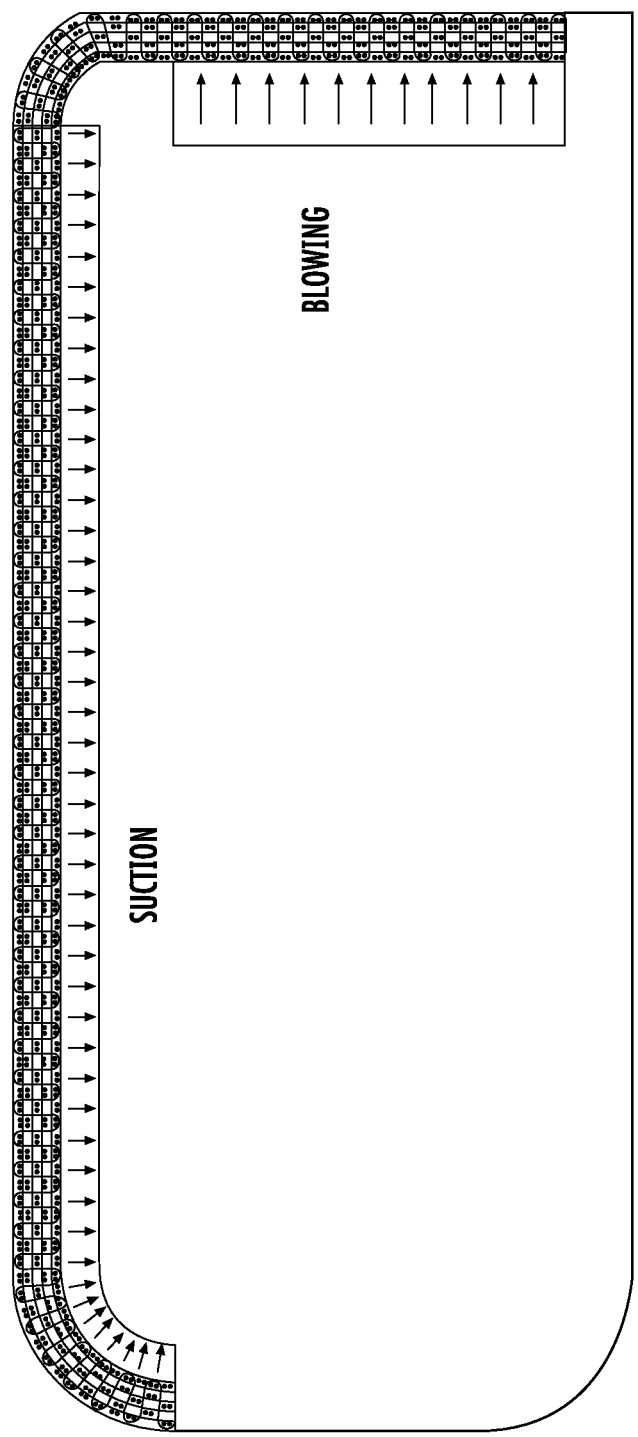
FIG. 2 illustrates a schematic view of an Ahmed body with applied micro-lattice material.
Figure 3:
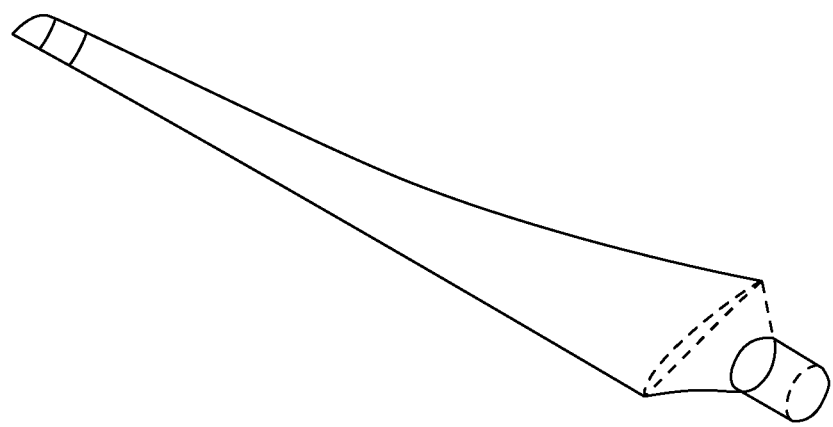
FIG. 3 illustrates an exemplary wind turbine blade, according to an embodiment of the present invention.
Figure 4A:
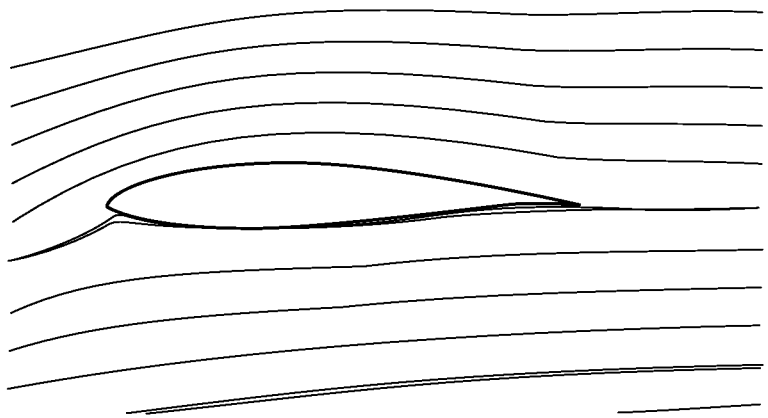
FIGS. 4A and 4B illustrate schematic wind diagram views of a comparison between the flow with and without suction device.
Figure 4B:
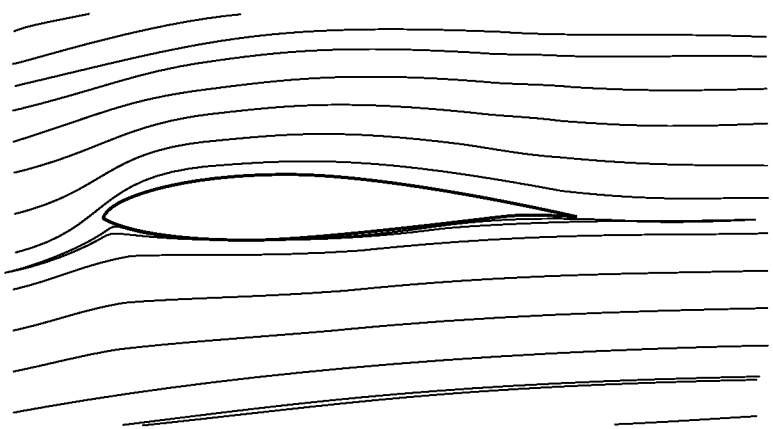
Figure 5:
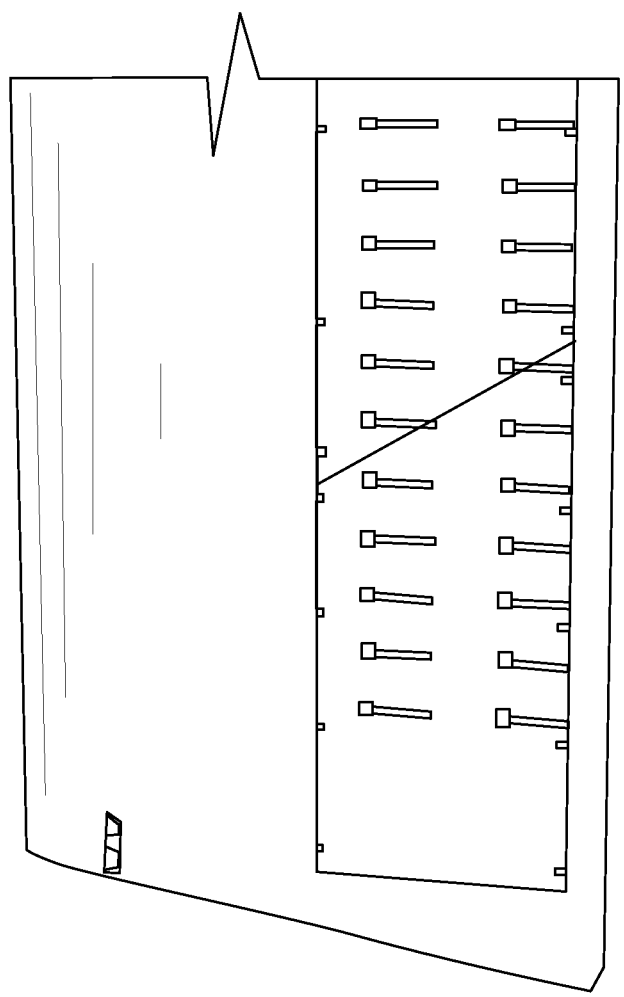
FIG. 5 illustrates an image of a design for a wind turbine blade implemented with distributed suction in order to obtain aerodynamic load control.

FIG. 2 illustrates a schematic view of an Ahmed body with applied micro-lattice material. The developed material has a potential to be used in conjunction with active control techniques such as suction or blowing through the porous material through the use of externally powered devices. In one exemplary implementation, illustrated in FIG. 3, a wind turbine blade includes suction through the cut-outs. FIG. 3 illustrates an exemplary wind turbine blade, according to an embodiment of the present invention. FIGS. 4A and 4B illustrate schematic wind diagram views of a comparison between the flow with and without suction device. FIGS. 4A and 4B illustrate flow streamlines around an airfoil surface at $\alpha=6°$. Woven materials could also be used with active suction and do not only rely on passive suction from the leeward side. FIG. 5 illustrates an image of a design for a wind turbine blade implemented with distributed suction in order to obtain aerodynamic load control.

The 3D lattice materials, including 3D woven lattice materials enable the control of directional permeability that could allow for more efficient flow control. 3-D woven lattice material has a number of advantages over random foams, namely: a) control over the architecture such that optimization can be employed to tune directional permeabilities, b) developed lattice material is ductile and robust. Thus, 3D micro-lattice materials can be easily applied to various bluff bodies and offer long service life. Whereas metallic foams are brittle in tension and so cannot be easily bent to shape; c) if left unbounded, the lattices are conformal and can be formed to complex shapes easily.

Figure 6A:
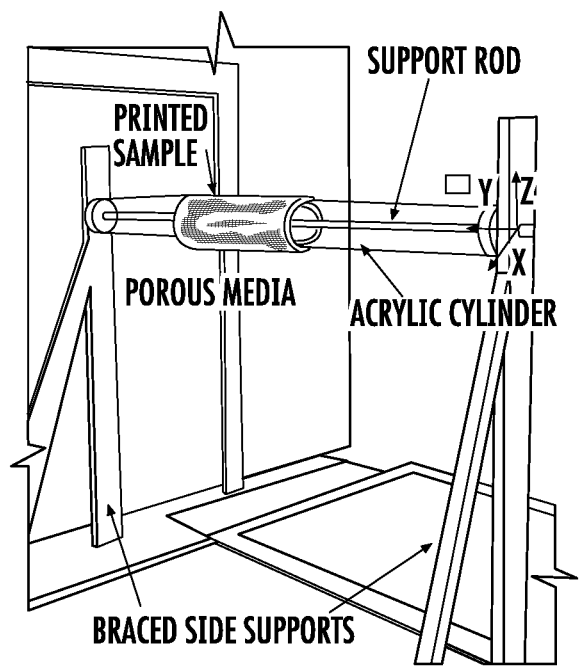
FIGS. 6A and 6B illustrate a preliminary wind tunnel for testing to verify the promise of 3-D woven micro-lattice architectures for passive flow control.
Figure 6B:
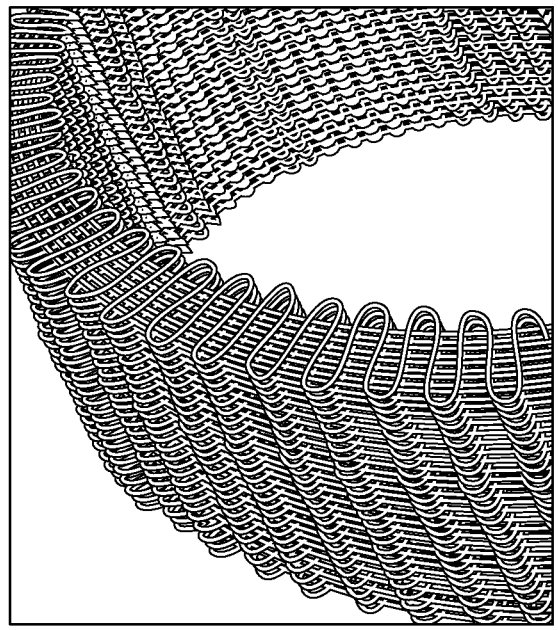

The preliminary wind tunnel results on cylinders partially coated with a micro-lattice sheath confirmed flow regularization and drag reduction are illustrated in FIGS. 6A and 6B. To demonstrate the concept, woven architectures were 3-D printed as permeable rings. Similar architectures can be achieved through the use of 3-D weaving. FIGS. 6A and 6B illustrate a preliminary wind tunnel for testing to verify the promise of 3-D woven micro-lattice architectures for passive flow control. Although a cylinder is not directly applicable to car design, it is a fundamental bluff body, and it is often the starting point for basic science studies. Flow around the cylinder needs to be understood first before car like geometries are studied.

Figure 7A:
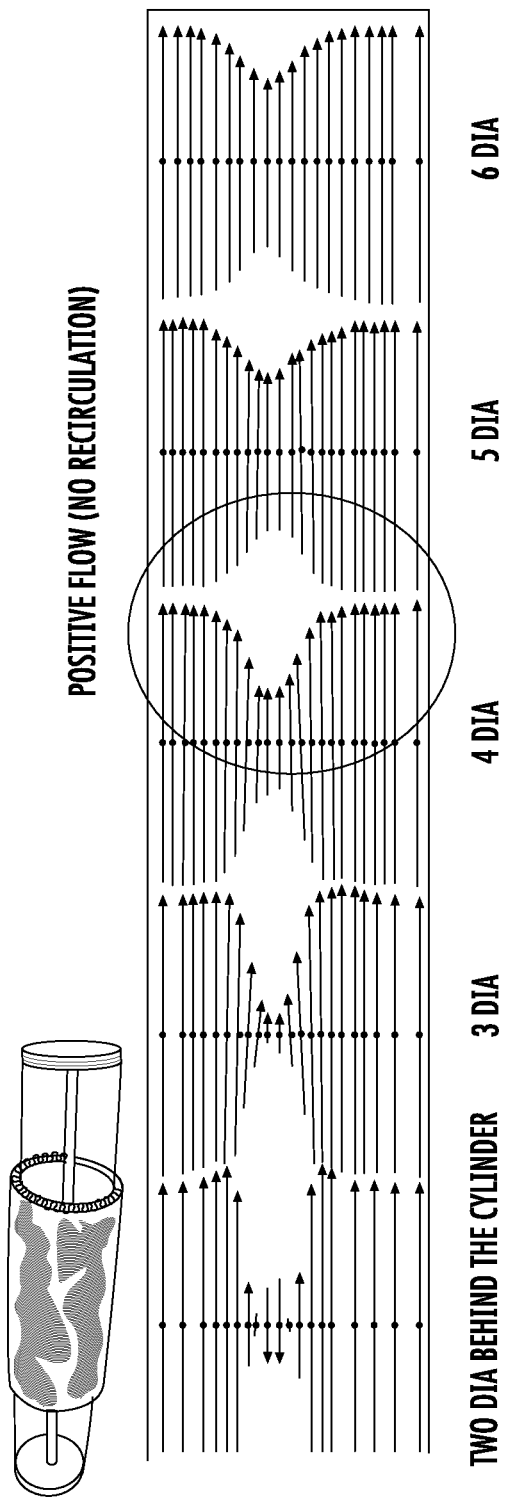
FIGS. 7A and 7B illustrate axial velocity vector plots, from preliminary tests, illustrate the recirculation zone for the 2× to 6× dia profiles downstream for a cylinder with a porous sheath and a smooth cylinder for comparison, respectively.
Figure 7B:
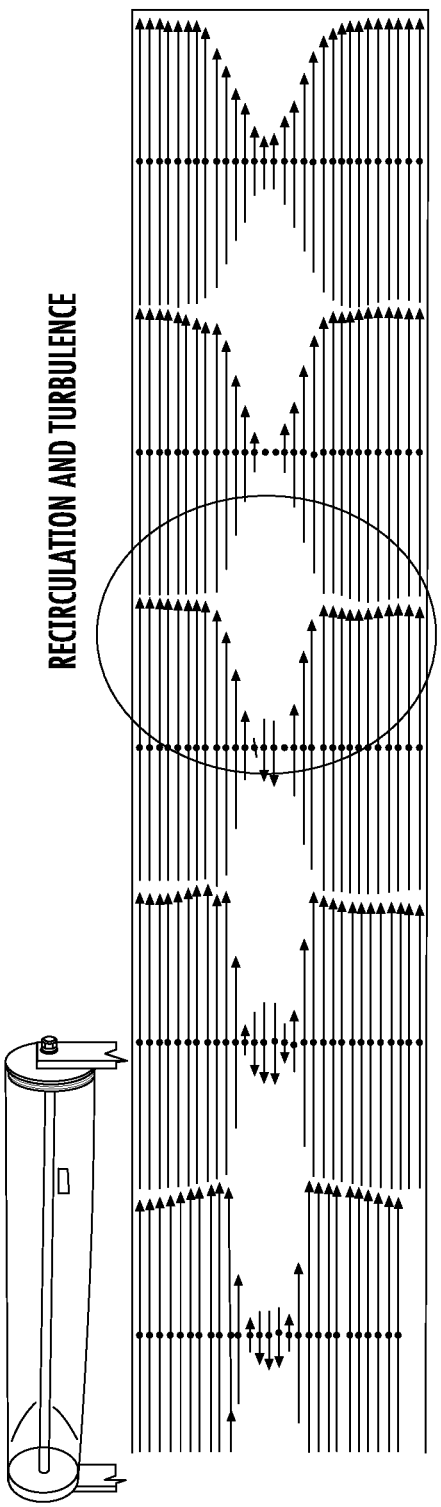

Preliminary tests on cylinders with the permeable lattice material sheaths confirmed that negative pressure region was reduced, as illustrated in FIGS. 7A and 7B. Drag coefficient of a cylinder with an architectured lattice skin was lower than of the same diameter smooth cylinder, as illustrated in FIGS. 8A and 8B. FIGS. 7A and 7B illustrate axial velocity vector plots, from preliminary tests, illustrate the recirculation zone for the 2× to 6× dia profiles downstream for a cylinder with a porous sheath and a smooth cylinder for comparison, respectively. FIGS. 8A and 8B illustrate drag coefficient of a smooth and sheathed tube measured in a student project supervised the author. Integration of the velocity in wake profile method was employed.

Figure 10A:
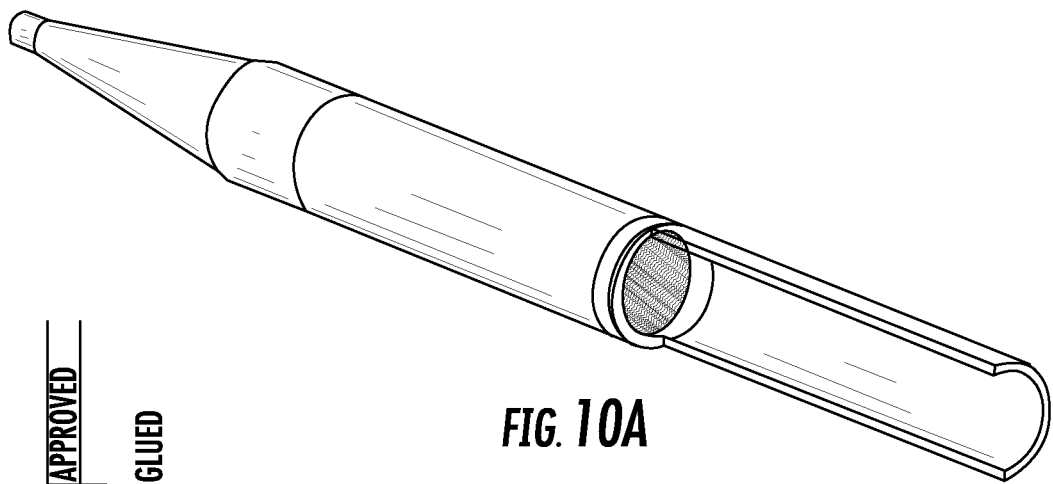
FIGS. 10A-10C illustrate schematic diagrams of the test material specimen plate for testing the present invention.
Figure 10B:
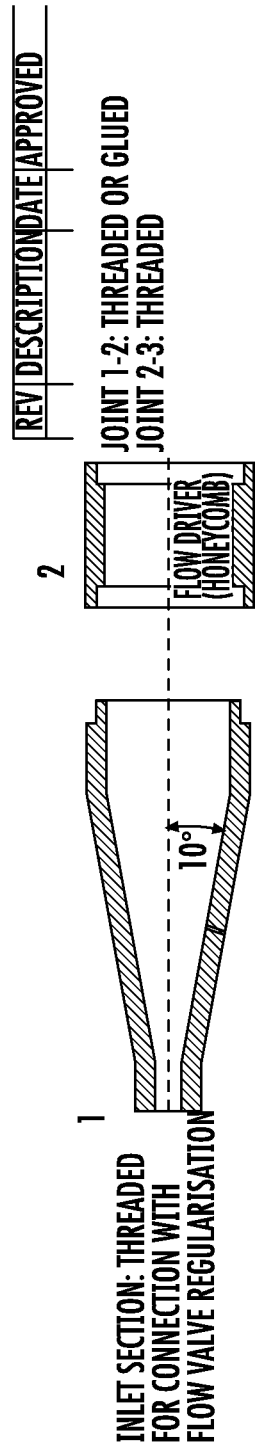
Figure 10C:
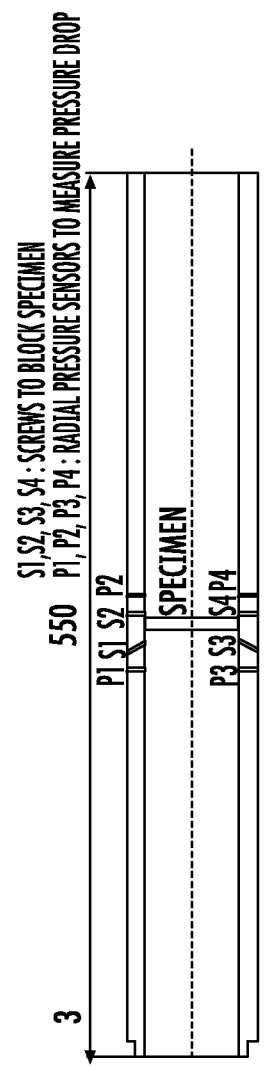

The present invention was used for testing of the flow around the car like 2-D and 3-D flows around models with functionally placed permeable sheath as illustrated in FIGS. 9A and 9B. FIG. 9A illustrates a schematic of an Ahmed's body for 2D flows. FIG. 9B illustrates an image of a representative model of a scaled lorry. In essence, we follow the path of experiment-model-optimize. To enable simulations of the ongoing experiments, permeabilities of the considered lattice structures were measured experimentally using circular plate samples (FIGS. 10A-10C). Pressure drops were measured for a range of flow velocities to obtain a pressure drop versus flow velocity curve. Such curve allows for the calculation of the material permeabilities in all three principal directions, as illustrated in FIGS. 10A and 10B. Woven micro-lattice materials possess anisotropic permeability. As illustrated in FIGS. 10A, 10B and 10C, pressure is measured on both sides of the tested material specimen plate to determine pressure drop vs flow velocity relationship that is needed to estimate the material permeability. Thus, anisotropic permeability flow formulation needs to be calibrated with three constants for each principal direction.

Figure 11A:
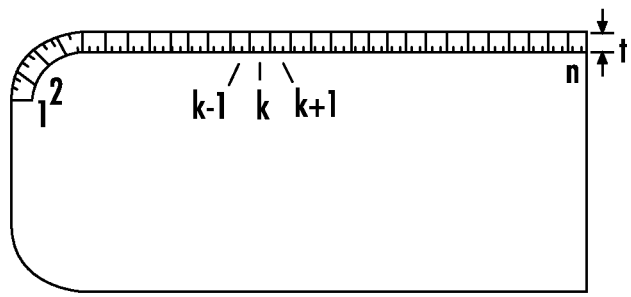
FIGS. 11A-11C illustrate image and schematic views of exemplary meshes, according to an embodiment of the present invention.
Figure 11B:
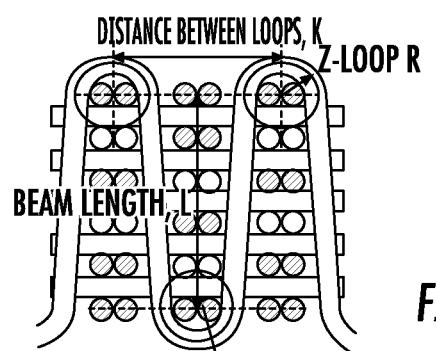
Figure 11C:
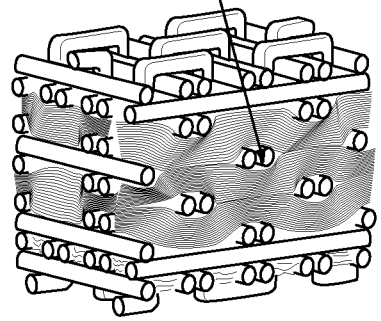

Optimal distribution of porous media to reduce drag, turbulence intensity, vortex induced vibrations or aeroacoustic noise such as trailing edge noise is possible. FIGS. 11A-11C illustrate schematic diagrams of multi-scale optimization of the permeable skins. The goal is to optimize the warp, fill, and z-direction permeabilities of the 3D woven lattice for lattice of uniform architecture, or a woven lattice whose architecture varies locally along the body surface (FIG. 11A), so as to minimize drag on the body and/or turbulence intensity.

A preferred embodiment of the invention employs 3-D printed polymer architectures, which, however, can be 3-D woven to reduce the cost and increase the speed of mass production in the future. Metallic, carbon, polymer and ceramic wires can be employed to 3-D weave the desired architectures. 3-D printing can achieve similarly good architectures in metallic, carbon, polymer and ceramic materials.

3-D woven lattice material can serve as a surface layer that regularizes the flow around a bluff body with beneficial effects on 1) drag reduction, 2) attenuation of flow-induced vibrations, 3) aerodynamic noise minimization. 3-D woven lattice architectures allow for passive flow control (without the need for external energy supply) around bluff bodies with restricted geometry/shape due to their functional requirements such as cargo trucks, train cars, wind turbine towers, etc. The woven material can be easily shaped to fit on various geometries and incorporated into existing manufacturing processes (from composites to metallic plates).

Cargo trucks could be fitted with a lattice skin in the leeward area to reduce the drag and, more importantly, fuel consumption. Railway transportation industry could be interested as well where permeable sheath could be applied at the roof of the passenger or cargo cars. Logistics firms could retrofit their fleet of vehicles with attachable surface fabrics to reduce fuel consumption and their operating cost. Such attachable skins could be printed with commercial or social messages to accelerate the return on the initial investment. Structural struts in aircraft landing gears could benefit from reduced drag and, more importantly, aerodynamic noise reduction. Bluff bodies such as struts are present in cooling systems, air-conditioning systems, etc. Reduction of their drag and turbulence generation could improve the efficiency of such systems such as better delivery of cool air or reduced power consumptions. The efficiency of wind turbines could be increased through reduction of aerodynamic drag of the turbine blades. Although there is a number of potential applications, one example of a drag reduction of bluff transportation vehicles such as cargo truck is used herein. This example is not meant to be considered limiting.

Figure 12A:
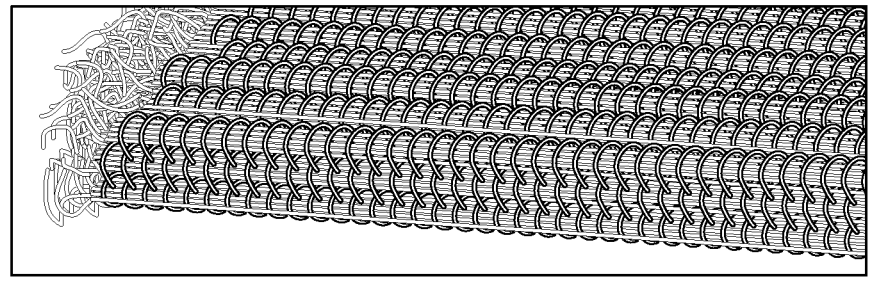
FIGS. 12A-12C illustrate image and schematic diagram views of a 3D CAD model of a 3D mesh according to an embodiment of the present invention.
Figure 12B:
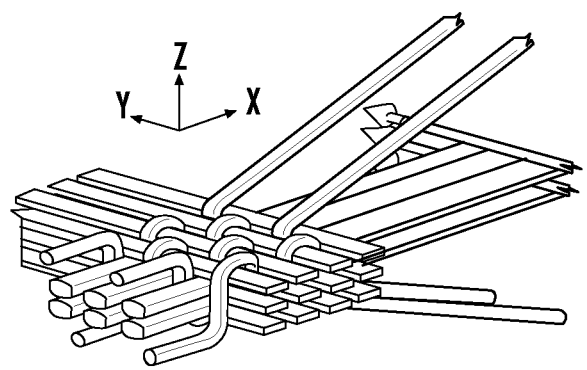

FIGS. 12A and 12B illustrate image and schematic views of exemplary meshes, according to an embodiment of the present invention. In one exemplary implementation, an optimized woven 3D mesh shown in FIG. 12A is wrapped around a cylinder to produce a porous coating. The material was made from 202 μm diameter wires woven into 3 mm thick mesh consisting of warp, weft and Z-wires. The weave pattern of these wires can be seen in FIG. 12B, note that the Z-wires are offset by 90° in alternate weaves in order to secure all the warp wires in the weave. A possible method for producing a sheath for a circular cylinder out of the material was to create a 3D printed sample of the material already in a cylindrical form. If 3D printed or manufactured using a different process, the architecture of the flow regularizing material need not take a woven lattice form, or lattice form at all, and could be designed specifically for these objectives.

Figure 12C:
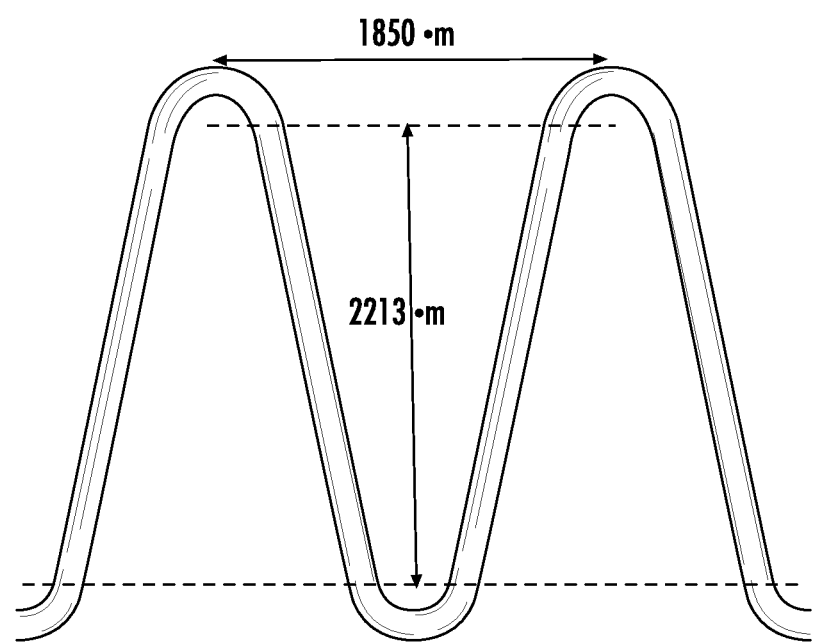

Before the CAD model of the mesh could be created an analysis of the behavior of the wires had to be made to approximate how the material would behave when wrapped around a cylinder. The Z-wire was estimated to take the shape shown in FIG. 12C when in its flat state. FIG. 12C illustrates a diagram of a Z-wire, according to an embodiment of the present invention. The period length was defined as the distance between two loops of the Z-wire (1850 μm) and the beam length was defined as the perpendicular distance between the center of the top and bottom loops (2213 μm).

The period length was then used to calculate the number of periods required to completely encase a cylinder of a given diameter in the material. These calculations were done at the mesh's neutral axis, taken to occur at the center of the material (approximately 1.5 mm from either surface). It was assumed that the distance between the wires at the neutral axis would remain constant in its deformed shape around the cylinder and the change in distance between the loops of the Z-wires was calculated.

The model approximated the circumferential distance between the loops as a straight line as their lengths were of the order of 1 mm or a circular arch for some models. The analytical model assumed that the loops next to the cylinder surface would compress together without altering the radius of the loop due to the presence of the warp wires preventing compression in this section. The loops at the free surface were modelled as being stretched apart with the loop radius remaining unchanged due to the much higher stiffness of Z-wire crowns in comparison to the force needed to open up the gaps between the crowns (denoted with 1850 μm in FIG. 12C). The increase in length of the external circumference was used to calculate the changes in spacing between the loops on the top, and the decrease in length of the internal circumference, in comparison to the unchanged neutral axis, was used to calculate the changes in spacing at the bottom surface.

After the analytical model was created for the original woven material, a 3D CAD model was created based on the outputs when using an internal cylinder diameter of 44.45 mm (1.75 inches). It was originally proposed to print the model with an internal cylinder as part of the CAD model however due to printing costs and time constraints only the woven material was printed in the final revision.

Further to discussions on possible material modifications, it was decided that some simple adjustments could greatly increase the material's porosity, the parameter believed to have the greatest effect on the drag reduction properties of the material. The first modification was the removal of the 90° offset in the alternating Z-wire layers. This modification resulted in some of the warp wires being left floating in free space. These wires proved difficult to print and so were removed from the model, further increasing the material's porosity and permeability.

Figure 13A:
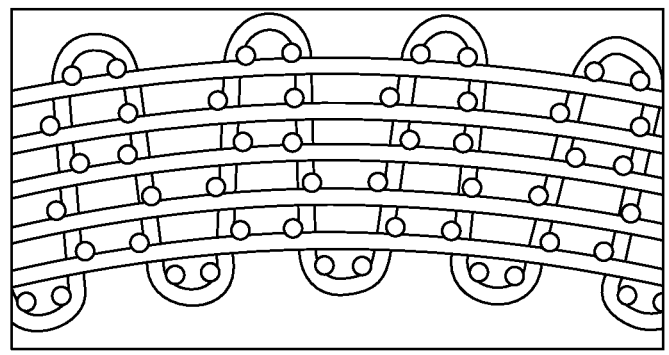
FIGS. 13A-13C illustrate schematic diagram views of a 3D CAD model of a 3D mesh according to an embodiment of the present invention.
Figure 13B:
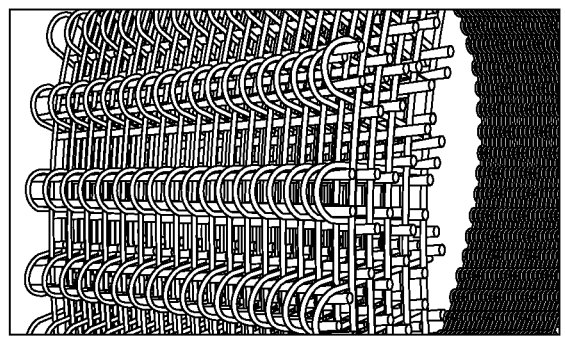
Figure 13C:
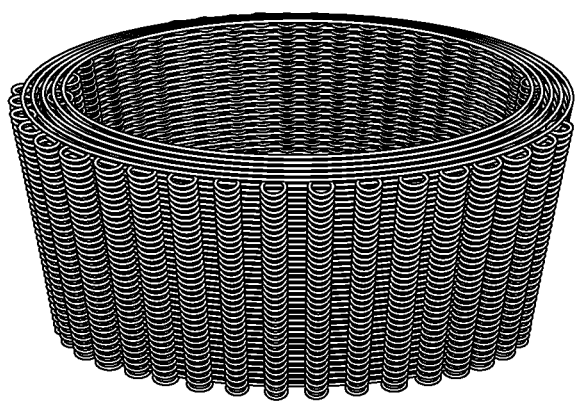

Another modification of the model was to have the warp wires overlap the weft and Z-wires in the model, although this modification increased the material porosity it was proposed due to fears of a lack of structural integrity in the printing process. This overlap between wires can be seen in FIGS. 13A-13C. FIGS. 13A-13C illustrate schematic diagram views of a 3D CAD model of a 3D mesh according to an embodiment of the present invention. FIG. 13A shows a close up over overlaps in the wires. FIG. 13B shows a close up of the bracelet section, and FIG. 13C shows the bracelet section in its entirety. It was added to ensure that every wire would have a contact point at numerous junctures along its length to help keep the structure rigid during printing and to prevent self-disassembly during experimentation.

Additional modifications were made due to the resolution of the printer available for a given embodiment of the present invention. The original model needed to be scaled up by a factor of 2 to meet the resolution requirements however this led to the blockage ratio of the wind tunnel cross-section that would be encountered in the experimental phase increasing beyond the 5% desired. The analytical model was rerun to calculate the required parameters for the model with a new internal cylinder diameter of 30 mm. With the cylinder scaled up, this new model then reduced the blockage ratio to back under 5%.

The aim of this project was to investigate the effect of the porous woven material on drag reduction and the wake characteristics. The test geometries used for this investigation were: a plain core cylinder with a 60 mm diameter, a plain cylinder with the equivalent outer diameter of the porous material (72 mm), the core cylinder sheathed in the porous material and the core cylinder sheathed in a partially covered porous material (180° and 270°). The coordinate system depicted in FIG. 6A represents the base axis system used throughout the experimental set up.

The system origin was positioned as shown in FIG. 6A. The core cylinder used for testing was a 60 mm external diameter acrylic cylinder, the 30 printed bracelet sections were situated onto the core cylinder for tests involving the porous medium. The bracelet sections were placed so that the center of the middle section coincided with the center of the core cylinder where the measurements would be taken. This cylinder was mounted by inserting two wooden plugs with center holes in either end of the tube to attach it to the support rod. A plain cylinder with the same external diameter as the 3D printed sample was also used for testing. This was made from PVC and was mounted by drilling a hole with the same diameter as the support rod in either end of the cylinder. The 3D printed sample was formed of 12 bracelet sections, each of which were 20 mm in length giving an overall length of 240 mm. The internal diameter of the bracelet section was 60 mm to ensure a tight fit on the core tube to prevent slipping during experimentation.

The support rig shown in FIG. 6A consists of two braced side supports and a threaded metal rod of 10 mm diameter which connected the supports at the top of the rig to provide additional support for the mounted tubes. The bracing and additional cylinder support were used as it was considered that at higher wind speeds the test rig might start to oscillate if left unbraced, which would interfere with the test data.

The partially covered porous coating tests were set up by applying duct tape over the appropriate angle of coverage. It was then anchored to the core cylinder on either side of the printed sample by applying duct tape around the circumference of the core cylinder to encase the ends of the strands of duct tape used to create the appropriate coverage angle.

The experiments were performed in an Aerodynamics Wind Tunnel. The tunnel has a working cross section of 1.1×1.4 m with a section length of 9 m. The tunnel is capable of realizing a maximum wind speed of 40 m/s and produces 0.2% free stream turbulence at this condition. A Pitot static tube located upstream of the model was used for measuring the reference velocity of the flow. A 20 Laser Doppler Anemometry (LOA) system was used to investigate the velocity profiles in the wake region at various distances downstream of the cylinder. At each point the vertical and horizontal velocity vector components were measured simultaneously. The laser light source used was a Spectra Coherent water cooled, Class 4 (4 Watt) argon ion laser. The laser was calibrated with wavelengths of 514.4 mm (green) and 488.0 mm (blue). The four partial beams were transmitted by fiber optics from the laser to the measuring head which had a focal length of 800 mm. The seeding for the investigation was provided by an oil droplet generator mounted below the working section. The laser set up gave data sampling rates of the order of 1000 Hz.

A total of 12 tests were carried out. Three were performed on the plain core cylinder and three on the plain outer diameter cylinder, to confirm Reynolds independence and for comparison purposes after post processing. Four tests were carried out on the full porous coating to investigate the Reynolds dependence of the material and the effects on drag reduction and wake characteristics. Each of the different test geometries underwent testing from the lowest Reynolds number case first, proceeding in ascending order, in the Reynolds dependence tests. Two further tests were performed on the material with a partial covering (180° and 270°) for comparison against the uncovered full coating with respect to the effect on drag reduction and the wake characteristics. Both of these tests were carried out at one Reynolds number only due to experimental time constraints. A summary of all the different test conditions undertaken can be found in Table 1.

TABLE 1

| Configuration | Diameter (mm) | Free Stream Velocity, $U_{Ref}$ (m/s) | Reynolds Number |
|---|---|---|---|
| Plain Core | 60 | 5 | 1.96E+04 |
| Plain Core | 60 | 7 | 2.73E+04 |
| Plain Core | 60 | 10 | 3.89E+04 |
| Plain Outer Diameter | 72 | 5 | 2.41E+04 |
| Plain Outer Diameter | 72 | 7 | 3.35E+04 |
| Plain Outer Diameter | 72 | 10 | 4.77E+04 |
| Fully Coated | 72 | 5 | 2.40E+04 |
| Fully Coated | 72 | 7 | 3.34E+04 |
| Fully Coated | 72 | 10 | 4.81E+04 |
| Fully Coated | 72 | 20 | 9.62E+04 |
| Partially Coated (180°) | 72 | 10 | 4.73E+04 |
| Partially Coated (270°) | 72 | 10 | 4.73E+04 |

Figure 14:
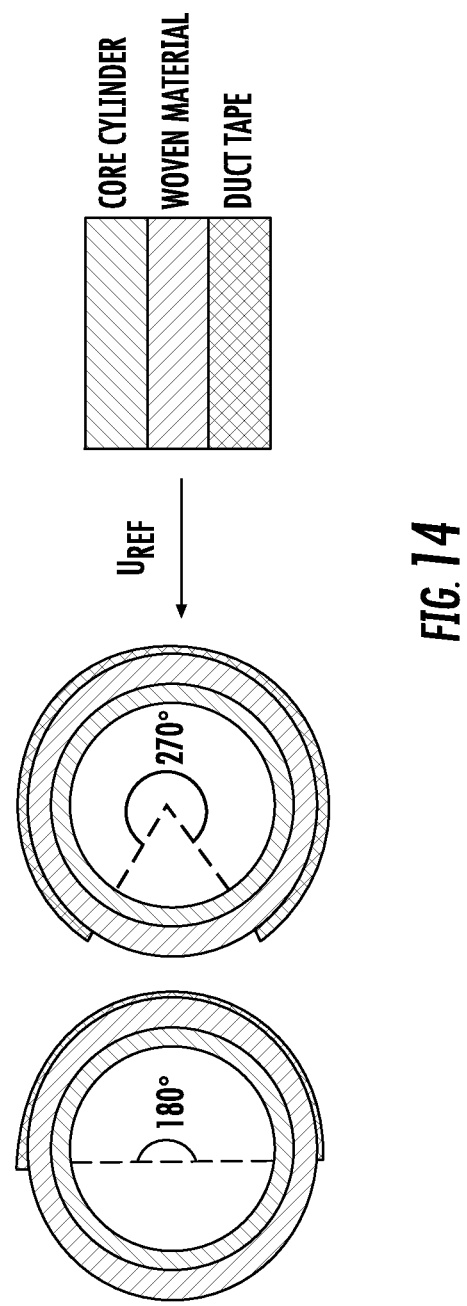
FIG. 14 illustrates a schematic diagram of both the partially covered tests to clarify the coverage angle.

For each test case velocity profiles were taken in the wake at the midpoint plane along the cylinder length the in the y-direction (horizontal direction in FIG. 1A). Profiles were investigated at 60, 120, 180, 240, 300, 360, 420 and 480 mm downstream in the x-direction. Each data point in the wake survey was time averaged for 0.5 s. The data was collated and outputted through Labview software. The plain outer diameter cylinder test was conducted first followed by the plain core cylinder test. This was done in order to minimize any possible damage to the printed sample by only having to fit it to the core cylinder once. This was a serious concern as the printed material was known to be brittle and the tolerance between the printed sample internal diameter and the core cylinder's outer diameter was minimal to prevent slippage or rotation during the experiment. The 180° and 270° partially covered tests were undertaken last as the effect of removing the duct tape from the sample was unknown. FIG. 14 illustrates a schematic diagram of both the partially covered tests to clarify the coverage angle.

Figure 15:
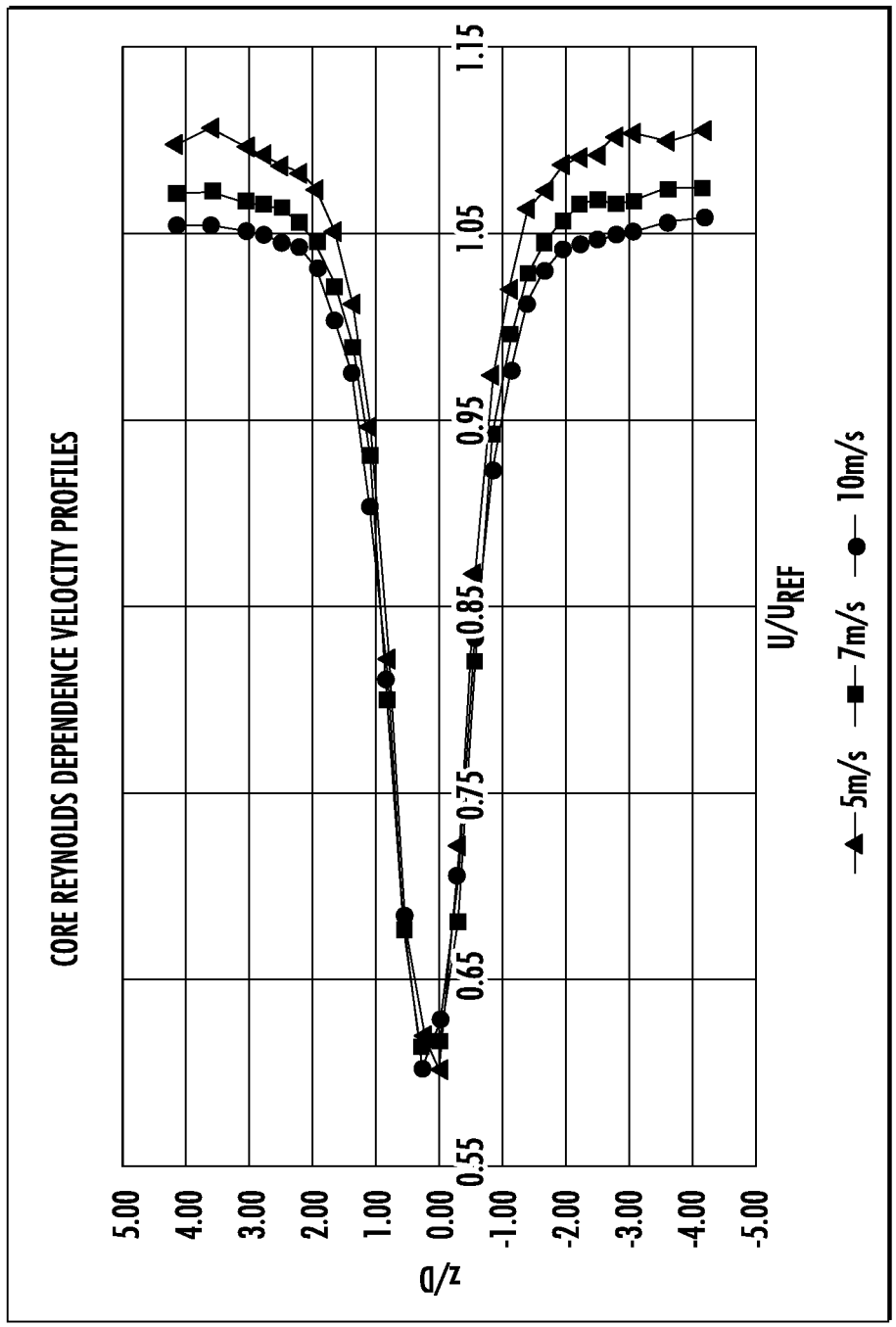
FIG. 15 illustrates a graphical view of velocity profiles at 420 mm downstream of the plain core cylinder at varying wind speeds.
Figure 16:
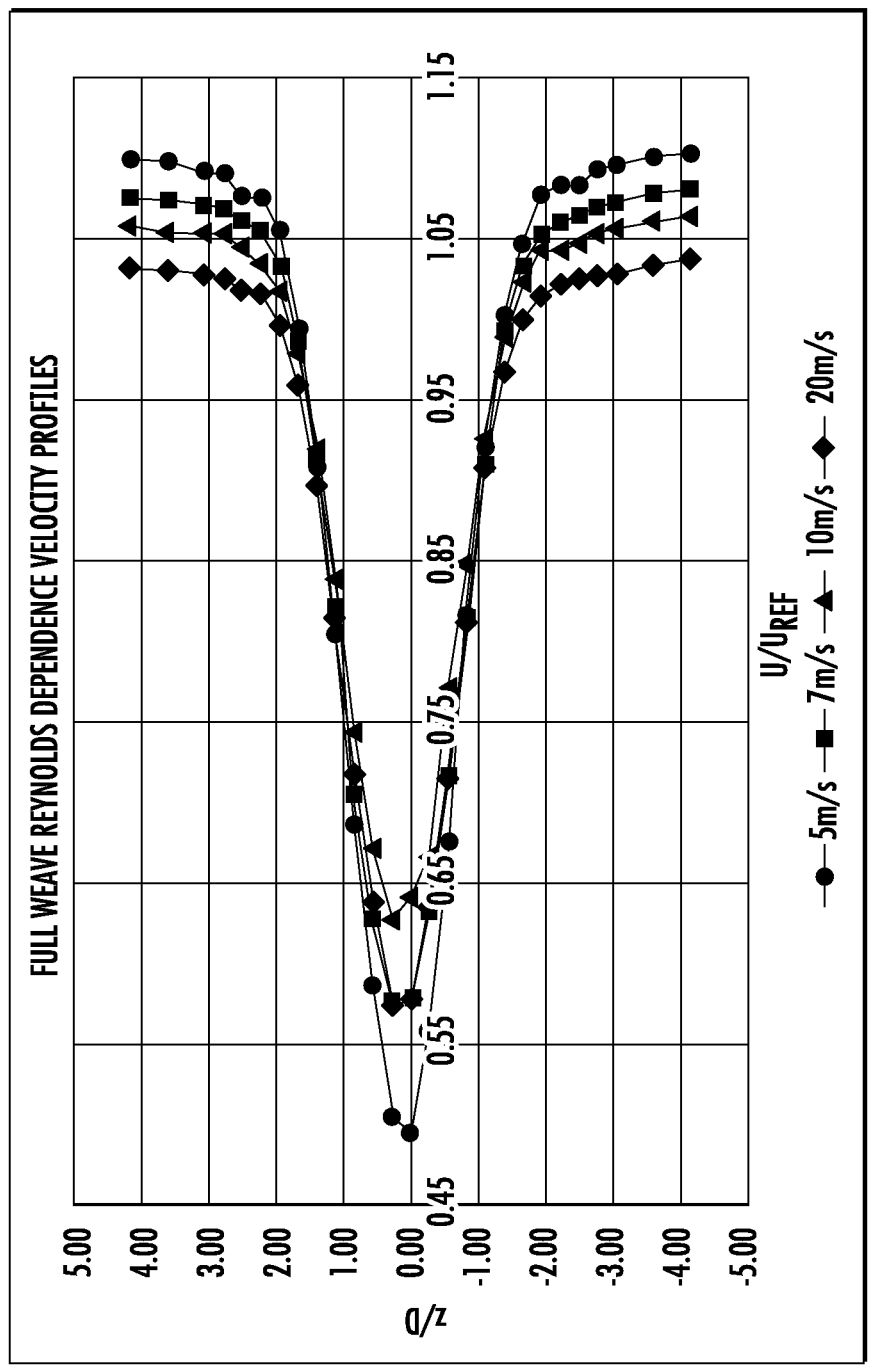
FIG. 16 illustrates a graphical view of velocity profiles at 420 mm downstream of the core sheathed in the uncovered woven material at varying wind speeds.

The first set of experiments undertaken were to confirm the cylinders' independence of Reynolds number. FIG. 15 shows the results of the core experiment with the profiles collapsing onto one another as expected. FIG. 15 illustrates a graphical view of velocity profiles at 420 mm downstream of the plain core cylinder at varying wind speeds. The data from the outer diameter cylinder tests showed a similar trend to that of the core, however, the core cylinder sheathed in the uncovered woven material did not behave in the same manner. FIG. 16 illustrates a graphical view of velocity profiles at 420 mm downstream of the core sheathed in the uncovered woven material at varying wind speeds. From FIG. 16 it can be seen that the flow behavior in the wake of the cylinder covered with the woven material was different at 5 m/s with the profiles for 7 and 20 m/s being almost identical and the 10 m/s profile being marginally different from the 7 and 20 m/s profiles.

Figure 17:
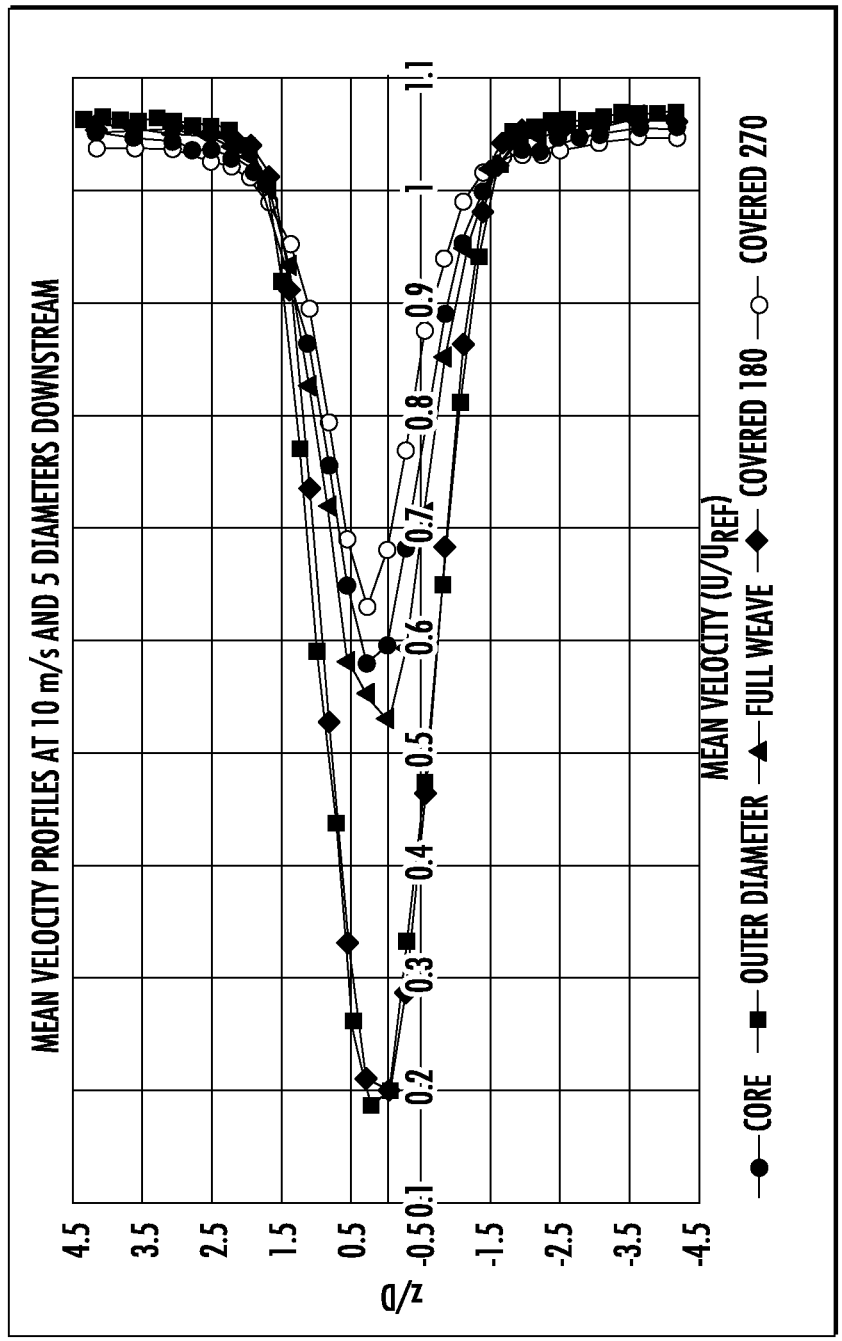
FIG. 17 illustrates a graphical view of a comparison of the mean velocity profiles of the different test scenarios at 5 diameters downstream with a wind speed of 10 m/s.

The next set of experiments were to investigate the effectiveness of the properties of the material with respect to drag reduction. Additional tests performed with partial coverings of the woven material were carried out at 1 Om/s to investigate the effect of partially covering the porous material versus the previous configurations. FIG. 17 illustrates a graphical view of a comparison of the mean velocity profiles of the different test scenarios at 5 diameters downstream with a wind speed of 10 m/s. FIG. 17 shows a comparison of the velocity profiles at 5 diameters downstream for the 10 m/s cases as expected from the existing literature. However, it is interesting to note that the uncovered weave test shows a reduction in drag compared to the plain outer diameter cylinder. Table 2 shows a summary of the drag coefficients calculated from all of the test scenarios carried out and further highlights that the porous coating seems to show improvements against the cylinder of the same outer diameter.

TABLE 2

| Configuration | Plain Core | Plain Outer Diameter | Fully Coated | Partially Coated (180°) | Partially Coated (270°) |
|---|---|---|---|---|---|
| $C_D$ (5 m/s) | 0.81 | 1.18 | 0.97 | — | — |
| $C_D$ (7 m/s) | 0.89 | 1.21 | 0.97 | — | — |
| $C_D$ (10 m/s) | 0.94 | 1.22 | 0.91 | 1.16 | 0.72 |
| $C_D$ (20 m/s) | — | — | 1.00 | — | — |

Figure 18:
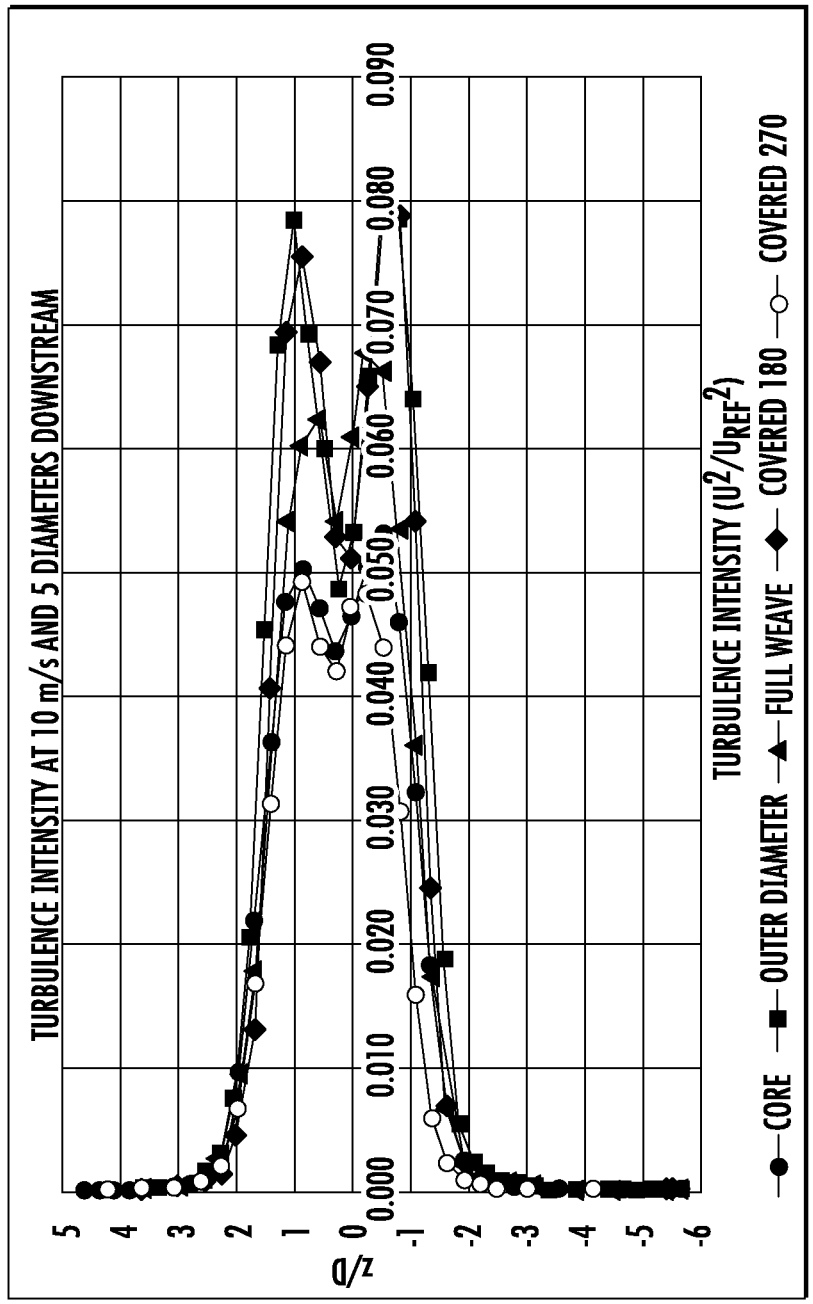
FIG. 18 illustrates a graphical view of a comparison of the turbulence intensities of the different test scenarios at 5 diameters down-stream with a wind speed of 10 m/s.
Figures 19A, 19B, 19C:
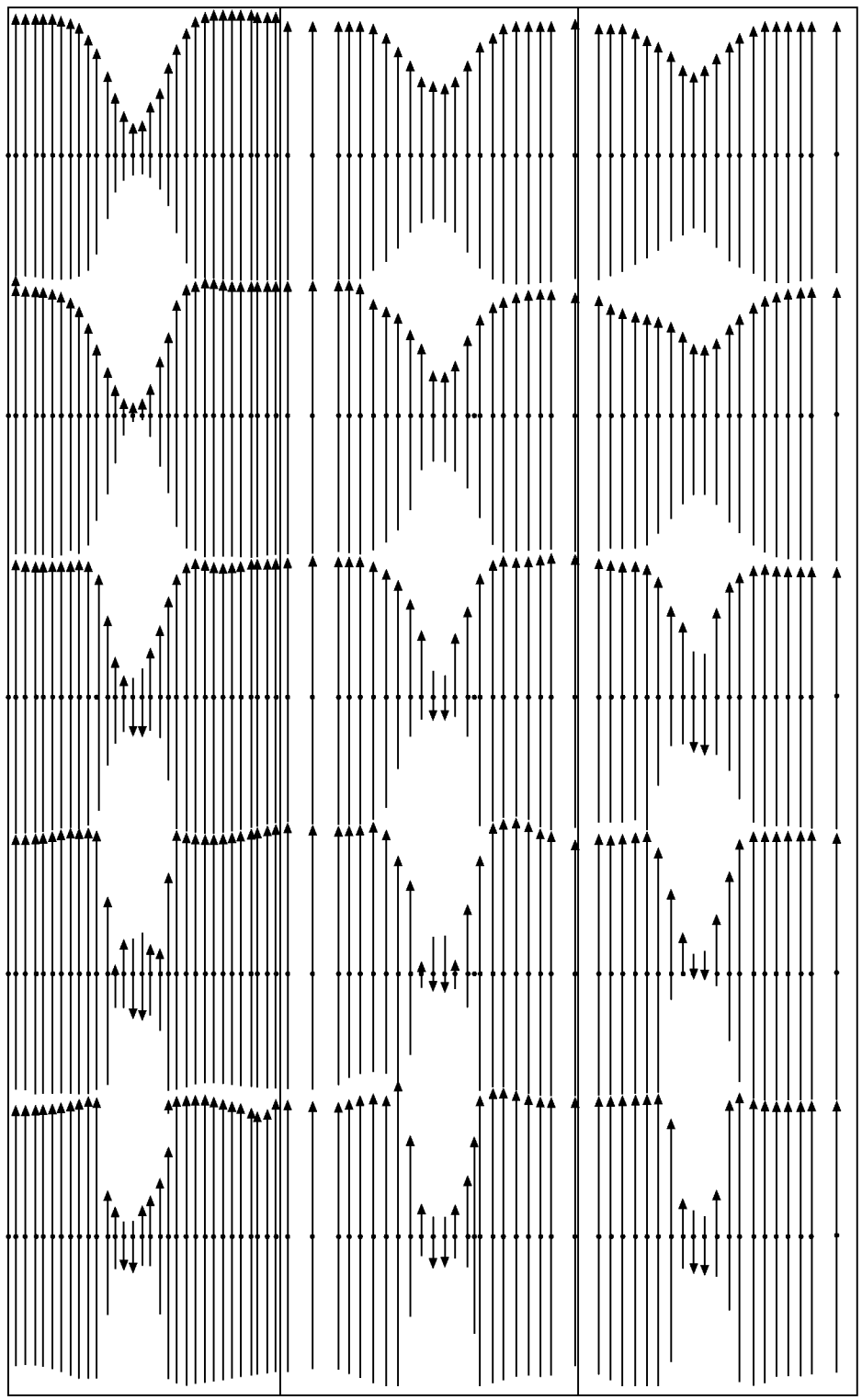
FIGS. 19A-19C illustrate a graphical view of vector plots showing the recirculation zone at 10 m/s for the 120-360 mm profiles downstream for an outer diameter cylinder, an uncovered weave, and a 270° covered weave, respectively.

Further comparison of the data collected also shows that the woven material has a significant effect on the characteristics of the flow in the wake region. FIG. 18 illustrates a graphical view of a comparison of the turbulence intensities of the different test scenarios at 5 diameters down-stream with a wind speed of 10 m/s. From FIG. 18 it can be seen that the woven material has reduced the level of turbulence intensity significantly in the wake at 5 diameters downstream in comparison to the outer diameter cylinder. Furthermore, the 270° covered scenario has reduced the turbulence intensity level to below that of the plain core cylinder. FIGS. 19A-19C illustrate a graphical view of vector plots showing the recirculation zone at 10 m/s for the 120-360 mm profiles downstream for an outer diameter cylinder, an uncovered weave, and a 270° covered weave, respectively. The vector plots of the wake region from 120-360 mm shown in FIGS. 15A-15C also show that the negative velocities in the recirculation zone have been reduced behind the woven material samples compared to the outer diameter cylinder. The flow behind the cylinder with woven lattice sheath and 270 deg tape cover recovered to the level of the external flow more quickly, when compared with the flow around a smooth cylinder. It can also be seen that the overall length of the recirculation zone has been reduced by the woven material.

The final processed results gave the drag coefficients of the plain core cylinder to be of the order 0.9 and those of the plain outer diameter cylinder to be of the order 1.2. Theory states that a smooth cylinder should have a drag coefficient of about 1.1 for Reynolds numbers of $2\times10^4 < Re < 4\times10^4$ and of about 1.2 for Reynolds numbers of $4\times10^4 < Re < 1\times10^5$. Although the drag coefficients calculated are all of the right order of magnitude, the core cylinder values are considerably lower than theory predicts.

A similar problem in the drag coefficient calculations by the wake method has been encountered before in experimentation but the anomaly is hard to explain. Previous sensitivity analyses show that a variation of 0.1 m/s in the reference velocity can cause changes of up to 3% in the calculated drag coefficients which may be a cause of error in the calculations. Furthermore, the variation between the two smooth cylinders used in this experiment may be accounted for by the difference in the number of measurements taken to produce the velocity profiles. The outer diameter cylinder experiment was run first with a significantly more refined vertical profile but time constraints necessitated that all of the following vertical profiles be coarsened. The coarsening of the vertical profile would lead to an increase in the truncation errors encountered in the numerical integration used in the post processing of the results and could be responsible for the variation seen between the calculated drag coefficient values.

The results of the experiments show both plain cylinders behaving independently of the Reynolds number over the range tested (1.96×104<Re<9.62×104) as was expected. The velocity profiles over the entire range tested for these cylinders shows the same collapsing of the profiles over one another that is shown in FIG. 15. The velocity profiles of the core cylinder coated in the woven material however, seemed to indicate that the flow was no longer independent of the Reynolds number. Such a result was unexpected as the porous medium tested by Ruck did not show such a dependence. Conversely, a comparison of the drag coefficients at varying Reynolds numbers for the covered cylinder seems to show an independence of Reynolds number as the maximum variation between the tests was 9%. Given that a fairly coarse vertical profile was taken for these experiments, this variation could be a product of the truncation errors from the numerical integration of the data and/or any random errors that occurred during the experimental procedure. With the variation seen in the results for the covered core cylinder, the Reynolds dependence of the material is hard to determine based on the limited data set collected. Ideally, a sweep of tests run over a similar Reynolds number range to that of Ruck's study would have been conducted to produce more conclusive evidence on the effects of the material on Reynolds dependence.

The results of the drag comparison experiments show the full sheath of porous material reducing the drag coefficient compared to the outer cylinder by 25%. This results is conflicting with the data from Ruck on porous foams, although there are possible explanations for the differences. As already discussed previously, the outer diameter cylinder vertical profiles were more refined than the rest of the experiment. Consequently, it is possible that some of the difference in the drag coefficient between the outer diameter cylinder and the full porous sheath can be attributed to the truncation errors in post processing. There are other differences between this project and the Ruck experiment that could account for the dissimilar behavior of the porous medium. The material chosen for this project exhibits a more regular porosity than the polymer foam used by Ruck and the possible effects this change could have on the flow characteristics is as yet unknown. Further study into the comparison of the drag coefficients using force balances rather than wake surveys would lead to a more definitive clarification on this issue.

The results of the 180° covered scenario showed no significant change from the full sheath scenario in complete contradiction to what previous literature suggests. However, the data from this experiment may have been noticeably skewed by a breakdown of the duct tape covering during the experiment. It was noticed upon the removal of the test sample that the duct tape towards the center of the sample had started to lift and peel away from the surface of the porous material. This loss of adhesion would have resulted in the tape fluttering during the experiment, inducing a significant amount of additional turbulence in the wake of the cylinder.

This additional turbulence would result in a substantial increase in the drag force experienced by the cylinder and could be a large contributing factor to the vast difference between the collected data and the expected trend. The results of the 270° covered scenario suggest that the mitigating action taken after the problems encountered with the 180° test were successful, the scenario resulted in a dramatic reduction in the drag coefficient. The reduction in the overall drag force experienced in this cylinder also suggests that optimization of the coverage angle is essential as this scenario yielded a 42% reduction in comparison to the outer diameter cylinder. The previous tests undertaken using polymer foams and a 180° coverage angle only managed an 8% reduction in the drag force.

Moreover, the scenario with the full sheath of woven material realized a reduction in the drag coefficient of 25% in comparison to the outer diameter cylinder (72 mm diameter). This scenario resulted in an 8% reduction in the overall drag force experienced on the plain core cylinder which has 12 mm smaller diameter (so called inner diameter cylinder). This reduction against a smaller cylinder was managed due to the 25% reduction in the drag coefficient being significant enough to be able to counteract the increasing blockage area. Further investigations into optimizing the coverage angle would be necessary to quantify the maximum reduction that could be expected through selective application of the material. The large reductions in drag coefficient observed in this project could have considerable implications on industry if they can translated to the geometries most often encountered in the transports sector. Selective application could yield reductions in the drag coefficient on a similar scale to that demonstrated in this project however further investigations into different geometries would need to be conducted to confirm the accuracy of the model.

The turbulence intensities encountered in the wake after the application of the porous medium suggest that the full sheath has regularizing effects on the flow. This is further highlighted by the reduction in the recirculation velocities and the shortening of the recirculation zone illustrated in FIGS. 19A-19C. The main possible mechanism responsible for this phenomenon could be the change in the slip boundary condition at the interface inducing a more regular vortex shedding pattern. Another possible cause is the reduction in pressure difference between front and lee side of the cylinder. Internal flow in the permeable sheath from high to low pressure zones may reduce such pressure difference and decrease the drag and vortex intensity.

These effects could have significant consequences for applications to underwater riser pipes by reducing the vortex induced vibrations experienced by the pipe. Such an effect could dramatically lengthen the overall life time of the riser pipe and reduce maintenance costs greatly.

Even greater improvements in the reduction of the turbulence intensities and recirculation velocities were seen in the 270° covered case. The flow behind the cylinder settled into a non-recirculating flow almost two diameters downstream earlier than the outer diameter cylinder case. This model would however prove harder to implement in the case of riser pipes as it is dependent on the flow direction being at the correct incidence to the coverage angle. Although the 270° case is the obvious choice for drag reduction the full sheath of woven material would be far easier to implement for the reduction in vortex induced vibrations in rise pipes due to its independence from the flow direction. Further experimentation into the effect of the material on vortex induced vibrations focused on the full porous sheath and the effect of the material porosity would be more appropriate for industrial applications regarding riser pipes. The coverage angles focused on in this project are more appropriate for pure drag reduction applications where the flow direction can usually be considered as constant. The results from this project present a substantial case for the selective application of porous media for drag reduction and energy saving in moving bodies such cars, trains and planes.

The velocity profile data suggests that the behavior of the flow over the woven material is dependent on Reynolds number to some degree. The difference in the velocity profiles does not however correspond to a significant change in the calculated drag coefficients at different Reynolds numbers. Therefore, the data collected does not provide conclusive evidence as to the Reynolds dependency of the material.

The greatest reduction was seen by the 270° covered sample which resulted in a 41% reduction in the drag coefficient of the outer diameter cylinder, which corresponds to 23% reduction in the drag force experienced by the inner core smooth cylinder. Thus, the drag reduction outweighed produced by the partial covered outweighed the increase of blockage ratio from the added thickness of the permeable sheath.

These findings could prove promising for applications in drag reduction and energy saving in moving bodies, particularly in the transport sector. The data from the 180° covered test case does not follow the trends shown by the other experiments performed in this project, nor does it corroborate with data from similar experiments undertaken by others. This data seems to have been heavily skewed by the duct tape starting to peel off the sample during experimentation, inducing a significant amount of additional turbulence. The woven material shows promising effects for regularizing the flow in the wake of the cylinder. The velocities in the recirculation zone were reduced significantly and the overall length of the recirculation zone was reduced by 120 mm in comparison to the outer diameter cylinder. The material also decreased the magnitude of the turbulence intensity in the wake region with the 270° sample managing to reduce the levels to below that of the plain core cylinder. These results indicate that the material may have promising prospects for use in reducing drag induced vibrations in bluff bodies.

It should be noted that the placement of the material on the bluff body is included herein as a factor that affects the function of the material as a drag reducing agent. More particularly, certain configurations of the material on the bluff body improve the drag reduction provided by the material. This may include portions of the windward side of the bluff body, leeward side of the bluff body, or combinations thereof. Portions of the bluff body not covered could be left exposed or covered with a spacer to fill the gaps between the material.

Figure 20:
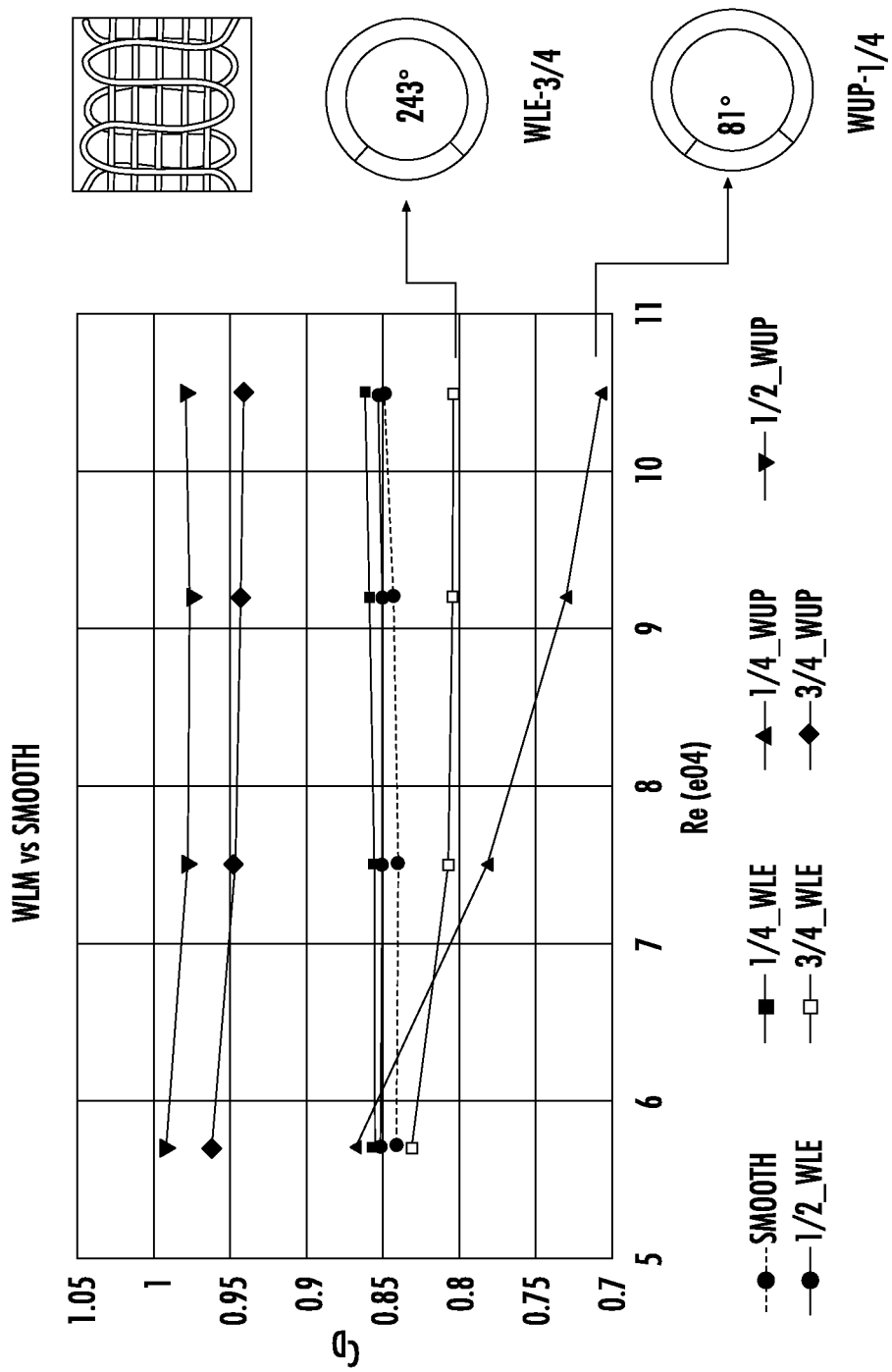
FIG. 20 illustrates a graphical view of drag reduction for the different configurations of drag reducing material.
Figure 21:
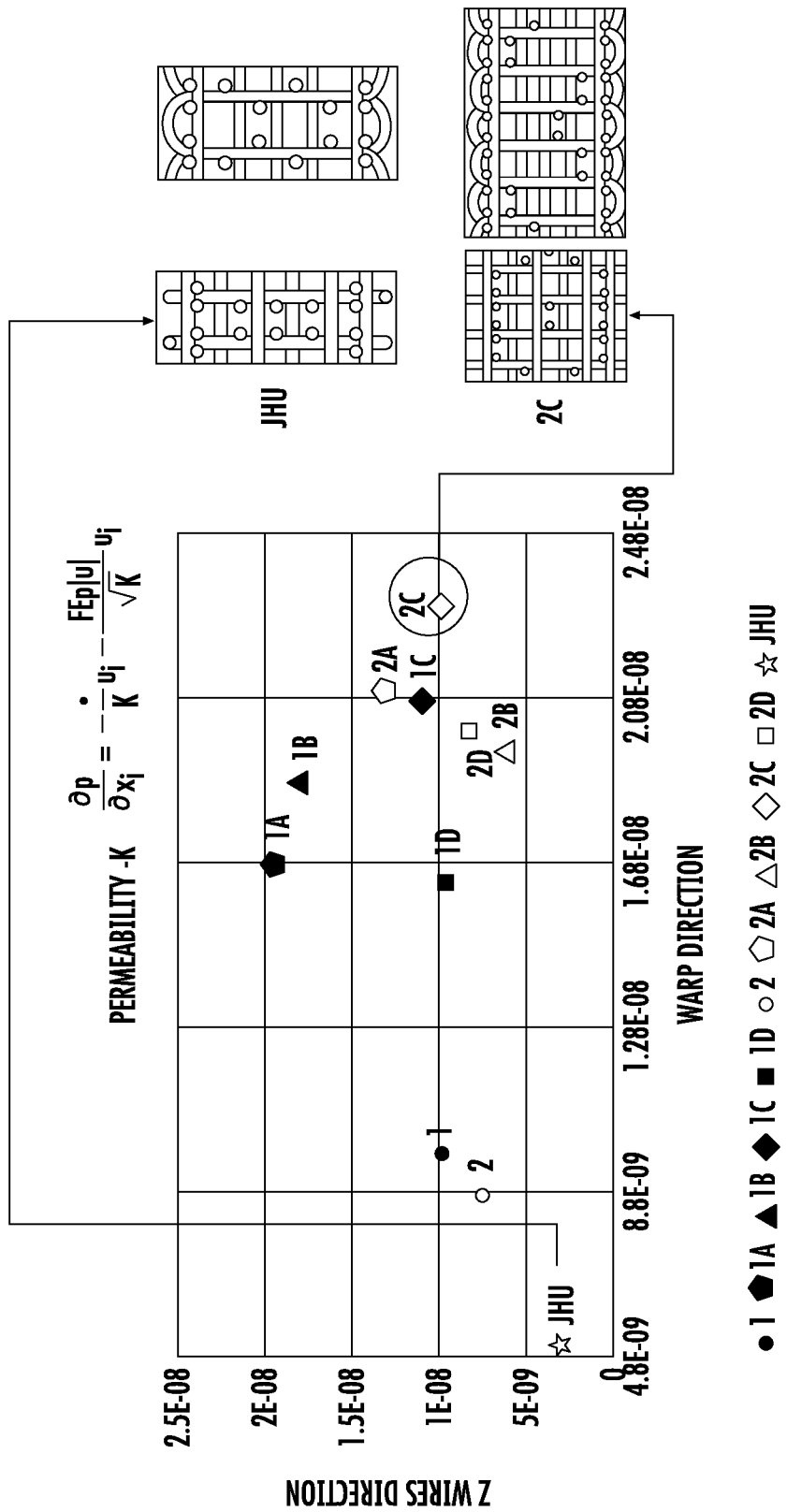
FIG. 21 illustrates a graphical view of a range of permeability possible, according to an embodiment of the present invention.

FIG. 20 illustrates a graphical view of drag reduction for the different configurations of drag reducing material. FIG. 21 illustrates a graphical view of a range of permeability possible, according to an embodiment of the present invention.

Figure 22:
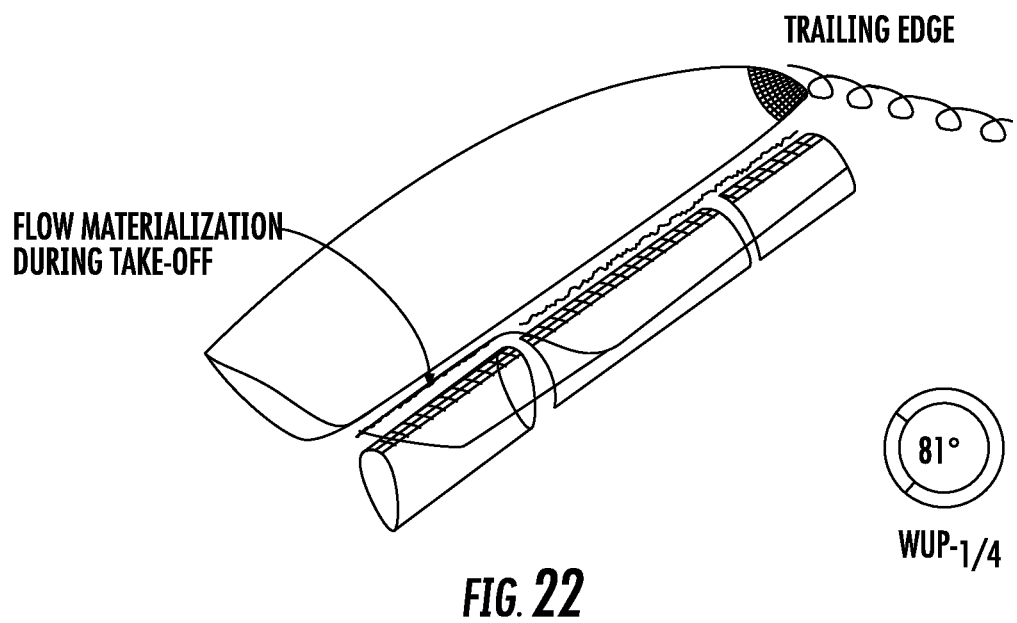
FIG. 22 illustrates an exemplary implementation of the drag reducing material of the present invention on an aircraft wing.

FIG. 22 illustrates an exemplary implementation of the drag reducing material of the present invention on an aircraft wing. As illustrated in FIG. 22, the drag reducing material of the present invention can be applied to the wing flaps. The drag reducing material is applied to a leading edge of the wing flap. The drag reducing material positioned on the wing flaps provides air flow regularization during take-off and landing. Further, regularizing air flow around the wing flaps can result in quieter cabin conditions and increased lift for the aircraft. Drag reducing material can also be applied to the trailing edge of the aircraft wing in order to further regularize air flow. Decreasing turbulent air flow about the wing of the aircraft could therefore also increase fuel efficiency.

Figure 23:
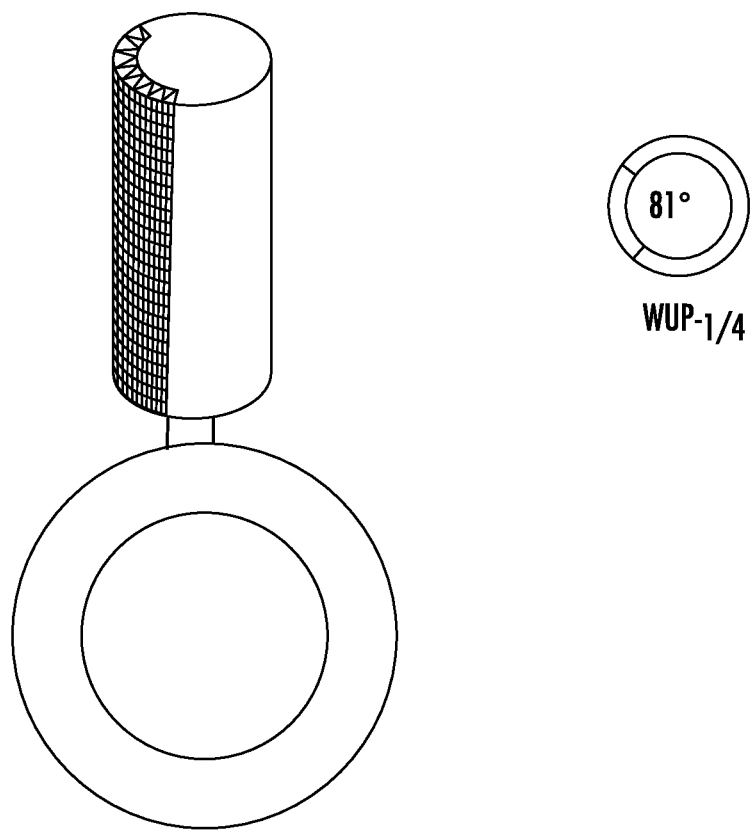
FIG. 23 illustrates an exemplary implementation of the drag reducing material of the present invention on a landing gear of an aircraft.

FIG. 23 illustrates an exemplary implementation of the drag reducing material of the present invention on a landing gear of an aircraft. As illustrated in FIG. 23 the drag reducing material of the present invention is applied to a leading edge of the landing gear. The drag reducing material positioned on the landing gear regularizes air flow during take-off and landing. Applying the drag reducing material can result in quieter conditions in the cabin of the aircraft.

Figure 24:
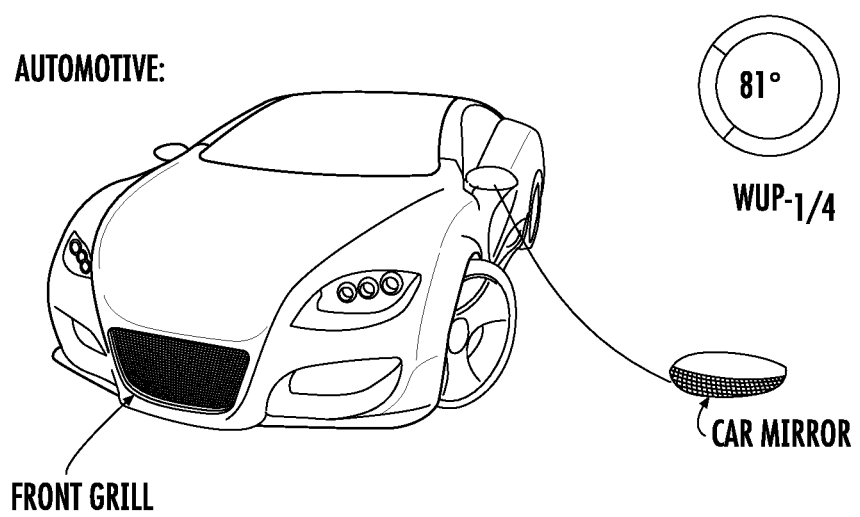
FIG. 24 illustrates an exemplary implementation of the drag reducing material of the present invention on an automobile.

FIG. 24 illustrates an exemplary implementation of the drag reducing material of the present invention on an automobile. As illustrated in FIG. 24 the drag reducing material can be applied to portions of the automobile such as the front grille and the side-view mirror caps. The drag reducing material is applied to a leading edge of the automobile components.

FIG. 25 illustrates an exemplary implementation of the drag reducing material of the present invention on a cargo trailer. As illustrated in FIG. 25 the drag reducing material can be applied to portions of the cargo trailer. The drag reducing material is applied to a trailing edge of the cargo trailer. Additionally, the material could be added to portions of the cab, or both the cab and trailer.

The drag and turbulence can be minimized or tailored by optimizing wire material chemistry (metallic, ceramic, etc.), wire size, wire coating to change surface roughness, wire shape, wire bonding, and wire architecture, including removal of wires to alter flow properties, in 3D woven materials. Additionally, the preceding statement applies to yarns composed as bundles of wires. In lattice materials fabricated from other processes (non-woven), such as additive manufacturing, the drag and turbulence can be minimized or tailored by optimizing lattice member material chemistry (metallic, ceramic, etc.), member size, member coating to change surface roughness, member shape, member bonding, and lattice architecture, including removal of members to alter flow properties, in 3D woven materials This project raised several areas for further investigation in order to develop a clearer understanding of the effects of the woven material on the bluff body, particularly in comparison to the foam counterparts that have been previously studied in this respect. Further study into the following areas will provide useful data for resolving the effectiveness of the material in drag reduction and understanding the changes realized in the wake profile: Perform a detailed investigation into the behavior of the material with respect to the Reynolds number of the flow to clarify the inconclusive data found in this project; carry out drag investigations using a force balance to produce more accurate values of the drag coefficient to be able to make better comparisons between the different cases test cases within the project and with different porous media; optimize the coverage angle of the woven material to maximize the reduction in drag coefficient; resolve the immediate wake region to understand the material's effect on the recirculation zone and the turbulence intensity; investigate the effect of the porous material on the vortex shedding frequency of the bluff body and the resulting effects on the vortex induced vibrations.

While weaving, meshes, and wires are used as examples herein, it should be noted that the material can be formed by 3D printing or any other suitable method known to or conceivable by one of skill it in the art. The wires can take the form of metallic, ceramic or polymeric wires or bundles and yarns of wires that are either solid or hollow like a tube. 3D structures according to the present invention be designed and optimized computationally instead of through iterative experiments. Optimization methods such as topology optimization, intuition motivated architectures, mechanical based designs, or any other suitable form of optimization known to or conceivable by one of skill in the art could also be used.

It should be noted that computer programming can be used to apply topology optimization to the organization of the wires in the mesh as well as determining and modeling optimized flow through the device.

A non-transitory computer readable medium that can be read and executed by any computing device can be used for implementation of the computer based aspects of the present invention. The non-transitory computer readable medium can take any suitable form known to one of skill in the art. The non-transitory computer readable medium is understood to be any article of manufacture readable by a computer. Such non-transitory computer readable media includes, but is not limited to, magnetic media, such as floppy disk, flexible disk, hard disk, reel-to-reel tape, cartridge tape, cassette tapes or cards, optical media such as CD-ROM, DVD, Blu-ray, writable compact discs, magneto-optical media in disc, tape, or card form, and paper media such as punch cards or paper tape. Alternately, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application is transmitted either wired or wirelessly over a network, via the internet, cellular telephone network, RFID, or any other suitable data transmission means known to or conceivable by one of skill in the art. A specialized and novel computing device that is configured to execute the method of the present invention is also included within the scope of the invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A device for providing regularization of fluid flow around an outer surface of a bluff body comprising:
   a flow regularizing material comprising a three-dimensional lattice structure configured to be applied at least in part to the outer surface of the bluff body;
   wherein an architecture of the three-dimensional lattice structure defines a fluid flow path within the three-dimensional lattice structure, wherein the fluid flow path comprises inlets and outlets defined by the flow regularizing material, wherein the fluid flow path is maintained within the three-dimensional lattice structure and outside of the outer surface of the bluff body, and wherein the three-dimensional lattice structure is designed so as to provide optimization and regularization of fluid flow around the bluff body, such that the optimization and regularization achieves a pre-determined result generated by the fluid flow path within the three-dimensional lattice structure and through inlets and outlets defined by the flow regularizing material; and
   wherein optimization of the flow regularizing material is controlled through modification of the three-dimensional lattice structure.

2. The device of claim 1 further comprising the flow regularizing material being configured to change a fluid flow boundary layer.

3. The device of claim 1 further comprising the flow regularizing material being configured to provide passive leeward suction from a flow separation zone to a leeward side of the bluff body.

4. The device of claim 1 further comprising the flow regularizing material being optimized for permeability and flow regularization of a pre-determined degree.

5. The device of claim 1 further comprising the flow regularizing material being configured for variations in directional permeability.

6. The device of claim 5 further comprising the flow regularizing material being configured for variations in directional permeability via tuning thickness, in-plane permeabilities, and through the thickness permeability of the material, and location of the material on the bluff body, based on geometry of the bluff body.

7. The device of claim 1 further comprising the bluff body taking the form of a trailer, truck cab, vehicle, bicycle, aircraft, aerofoil, structures, bridges, towers, buildings, engine turbine blades, or wind turbine blades.

8. The device of claim 1 further comprising the fluid taking the form of air or liquid.

9. The device of claim 1 further comprising a cover or cladding for the flow regularizing material or solid sections.

10. The device of claim 9 further comprising the cover or cladding being configured with different levels of directional permeability and its thickness distribution.

11. The device of claim 1 equipped with active suction or blowing device underneath permeable sheathing for active flow control.

12. The device of claim 1 equipped with active control device to change the external and/or internal geometry of the flow regularizing material for active flow control.

13. The device of claim 1 further comprising the flow regularizing material being formed with one selected from a group consisting of 3D printing or weaving.

14. The device of claim 1 further comprising the lattice structure modification being one selected from a group consisting of topology optimization, size optimization, and shape optimization.

15. The device of claim 1 further comprising a surface coating.

16. The device of claim 13, wherein the flow regularizing material is formed by weaving of a plurality of warp wires, a plurality of fill wires, and a plurality of z-wires.

17. The device of claim 16 wherein the plurality of warp, fill, and z-wires comprise a polymer, metal, ceramic, or shape-memory metal, or combination thereof.

18. The device of claim 1 wherein the flow regularizing material is applied to a portion of the leading edge of the bluff body.

19. The device of claim 1 wherein the flow regularizing material is applied to a portion of the trailing edge of the bluff body.

20. The device of claim 1 wherein the flow regularizing material is applied to a portion of the leading edge and a portion of the trailing edge of the bluff body.

21. The device of claim 1 wherein the flow regularizing material is used for regularizing flow on one selected from a group consisting of an aircraft fuselage, aircraft wing, aircraft wing-flap, aircraft landing gear, automobile, automobile component, vehicle, cargo trailer, truck cab, bicycle, aerofoil, structure, bridge, tower, building, engine turbine blade, or wind turbine blade.

22. The device of claim 16 wherein the plurality of warp, fill and z-wires comprises one selected from a group consisting of a solid wire, a hollow wire, and a yarn.

23. The device of claim 16 wherein the plurality of warp, fill, and z-wires have rough surfaces, either naturally or modified.

* * * * *